(12) United States Patent
Kost et al.

(10) Patent No.: US 6,256,909 B1
(45) Date of Patent: Jul. 10, 2001

(54) ONE PLUG SYSTEM FOR A SNOWPLOW

(75) Inventors: James A. Kost, Willoughby; Tim K. Howell, Eastlake, both of OH (US)

(73) Assignee: The Louis Berkman Company, Steubenville, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/667,579

(22) Filed: Sep. 22, 2000

Related U.S. Application Data

(63) Continuation-in-part of application No. 09/510,048, filed on Feb. 22, 2000, now Pat. No. 6,138,388.

(51) Int. Cl.[7] .................................................. E01H 5/04
(52) U.S. Cl. ............................... 37/231; 315/82; 362/496; 362/507; 362/85; 307/10.8; 307/157
(58) Field of Search .................... 37/231, 235; 307/10.1, 307/10.8, 9.1, 157, 149, 150, 154–156; 315/82, 77; 362/496, 507, 85

(56) References Cited

U.S. PATENT DOCUMENTS

| | | |
|---|---|---|
| 3,706,144 | 12/1972 | Miceli . |
| 3,773,074 | 11/1973 | Miceli . |
| 4,279,084 | 7/1981 | Low et al. . |
| 4,280,062 | 7/1981 | Miller et al. . |
| 5,036,608 | 8/1991 | Ciula . |
| 5,361,519 | 11/1994 | Ciula et al. . |
| 6,005,300 | 12/1999 | Kelly . |
| 6,015,219 | 1/2000 | Kelly . |
| 6,138,388 | * 10/2000 | Kost et al. .............................. 37/231 |

* cited by examiner

Primary Examiner—Christopher J. Novosad
(74) Attorney, Agent, or Firm—Vickers, Daniels & Young

(57) ABSTRACT

An external electrical connector for connecting one or more components of a snowplow blade unit. The electrical connector includes two housing components that are securable together. Each housing component includes an interface end and a coupling end. The coupling ends of the two housing components are designed to be connect together to form an electrical connection. At least one of the interface ends includes at least one electrical connection interface that is designed to form an electrical connection with at least one external snowplow blade component. One of the housings components is secured to a component of said snowplow blade unit. Protection caps and housing holders are used to protect the parts of the housings when the housings are disconnected from one another.

35 Claims, 11 Drawing Sheets

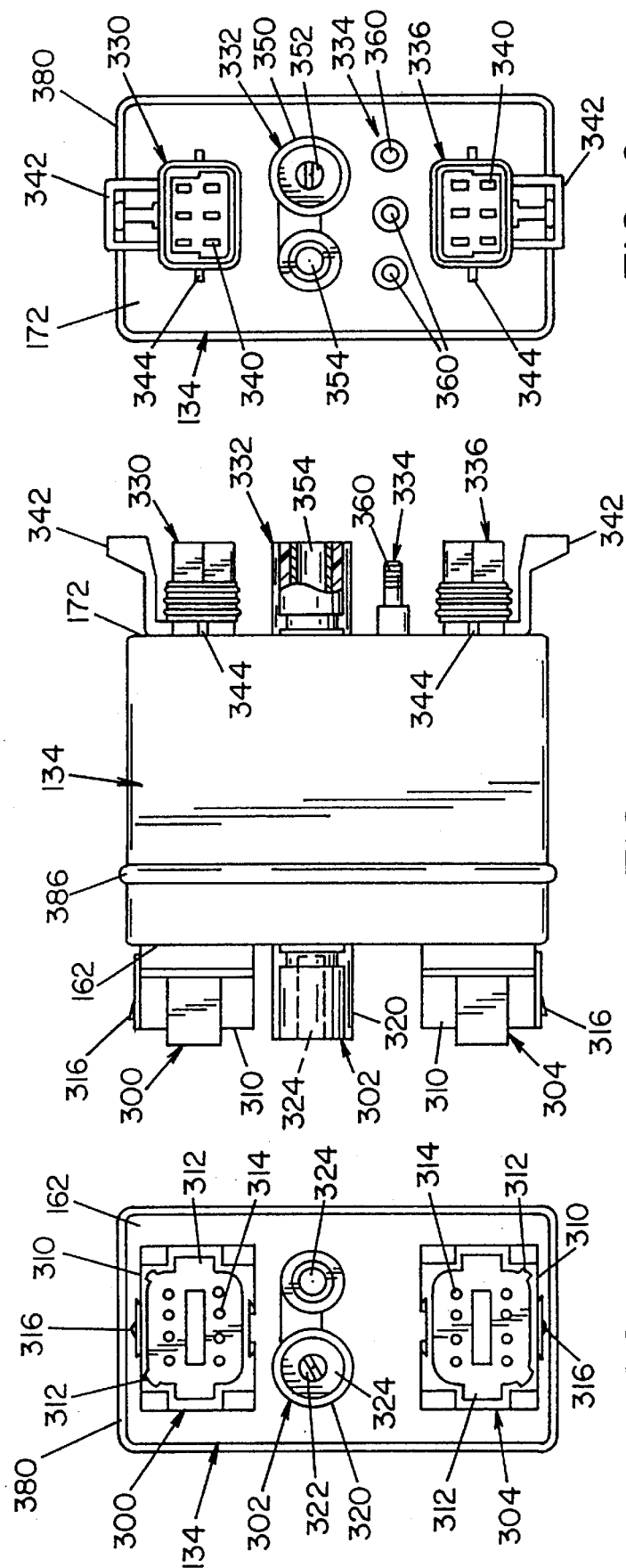

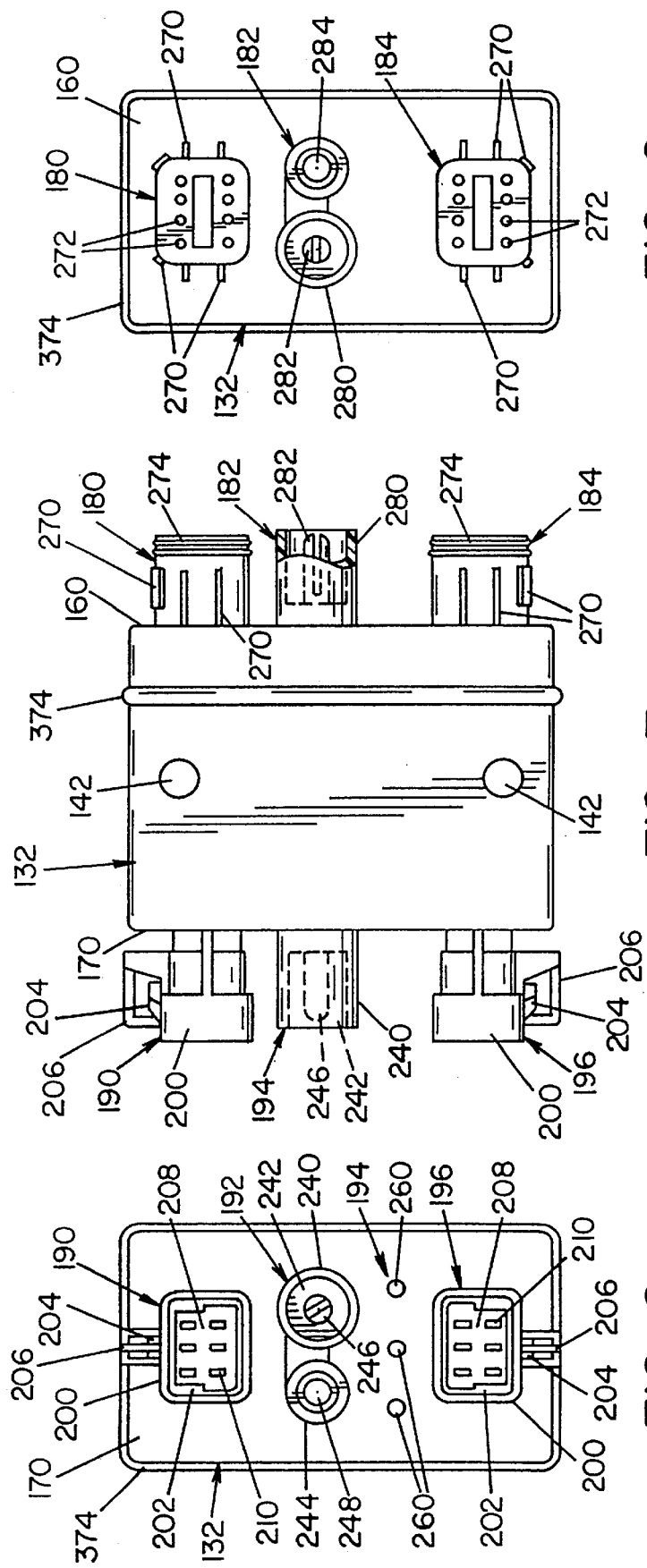

ONE PLUG SYSTEM FOR A SNOWPLOW

The present invention is a continuation-in-part of co-pending U.S. patent application Ser. No. 09/510,048, filed Feb. 22, 2000 entitled "Improved Plug System for a Snowplow, now U.S. Pat. No. 6,138,388."

INCORPORATION BY REFERENCE

U.S. Pat. No. 6,005,300, issued Dec. 21, 1999, entitled "Light Harness"; U.S. Pat. No. 6,015,219, issued Jan. 18, 2000, entitled "Auxiliary Lamp Unit" and U.S. patent application Ser. No. 09/563,985, filed May 3, 2000, entitled "Light Harness" are incorporated herein as background information on prior art auxiliary light harnesses and auxiliary light designs. U.S. Pat. Nos. 5,361,519; 3,773,074 and 3,706,144 are incorporated herein as background information on prior art lift units incorporating a solenoid. U.S. patent application Ser. No. 09/449,945, filed Nov. 29, 1999, entitled "Snow Plow Mount"; U.S. Pat. No. 5,036,608, issued Aug. 6, 1991, entitled "Snowplow Quick Mount Lift Assembly" and U.S. Pat. No. 4,279,084 are incorporated herein as background information on snowplow blade units that are easily detachable and reattachable to a vehicle and/or types of snowplow blades. U.S. patent application Ser. No. 09/510,048, filed Feb. 22, 2000, entitled "Improved Plug System for a Snowplow" is incorporated herein to disclose an improved plug system that can be used in the present invention.

The present invention relates to the art of snowplows for automotive vehicles and, more particularly, to the wiring and connection arrangement for connecting the solenoid of the lift unit and/or auxiliary lights for the snowplowing system. The present invention finds particular utility in connection with vehicles having an attachable and detachable snowplow blade unit and, accordingly, is disclosed and described in detail hereinafter in connection with such use.

BACKGROUND OF THE INVENTION

In a snowplow and control system arrangement of the character disclosed in U.S. Pat. Nos. 5,361,519; 5,036,608 and 3,706,144 and in U.S. patent application Ser. No. 09/449,945, filed Nov. 29, 1999, the snowplow blade is mounted on the front of a vehicle such as a car, truck, or the like, together with one or more hydraulic cylinders by which the blade is elevated and lowered relative to the vehicle and the underlying ground and by which the blade is angled to the left or right relative to the vehicle and ground. The snowplow blade unit includes one or more solenoids that operate valves by which the flow of hydraulic fluid to and from the hydraulic cylinders is controlled to achieve the various positioning functions of the snowplow blade. Selective positioning of the snowplow blade through the control of the solenoid valves and an electric motor driven hydraulic pump is achieved through a control device mounted in the cab of the vehicle such as on the dashboard thereof for operation by the vehicle operator. Typically, an electrical cord of sheathed conductors extends from the control device in the cab of the vehicle to the operating components of the system.

Auxiliary lights are used in combination with the snowplow lift unit to enable an operator to operate the snowplow during evening hours. The snowplow blade unit is typically mounted to the front of the vehicle. As a result, the snowplow blade unit blocks the light generated by the headlights of the vehicle. The auxiliary lights are commonly mounted on the snowplow blade unit and/or positioned on the vehicle so as to provide illumination to a road surface during the operation of the snowplow.

The auxiliary lights and the one or more solenoids for the lift unit use separate wiring arrangements to operate the solenoids and the auxiliary lights. As shown in U.S. Pat. No. 3,706,144, the solenoid is connected to several wires which cause the solenoid to operate the lift unit, which in turn lifts and lowers the snowplow and/or moves the snowplow from side to side. These wires from the solenoid are fed through the grill of the vehicle, through the engine compartment and fire wall, and into the passenger compartment of the vehicle where the wires are connected to a controller. In addition to the solenoid control wires, the lift unit is connected to one or more power cables to energize the electric motors in the lift unit. These power cables are fed from the lift unit through the grill and into the engine compartment to be connected to a battery. The auxiliary lights also include electric connections. A typical wiring arrangement for the auxiliary lights is shown in U.S. Pat. Nos. 4,280,062 and 6,005,300. Each auxiliary light is connected to a set of wires that lead from the auxiliary light, through the grill of the vehicle and into the engine compartment. As a result, at least four sets of wires are routed through the grill when the lift unit and auxiliary lights are connected to the vehicle.

The number of wires needed to operate the lift unit of the snowplow and the auxiliary lights made it difficult and inconvenient to disconnect and reconnect the snowplow blade unit and/or auxiliary lights from the vehicle. Furthermore, the wires for the lift unit and the auxiliary lights needed to be properly connected together, or possible damage to the components could occur and/or the components would not operate properly. In addition, when the various wires are disconnected from the auxiliary lights and/or lift unit, the wire ends are left to hang in the front of the vehicle. As a result, the operator must repeatedly pull the wires through the grill and somehow secure the lose wires in the engine compartment or risk damage to the suspended wires. Due to the complexity and/or inconvenience in the wiring of the auxiliary lights and lift unit, the snowplow blade unit and auxiliary lights typically remain on the vehicle throughout the winter months even though the snowplow blade unit can be easily detached and reattached to the vehicle.

To address the problem of quickly and conveniently connecting and disconnecting the electrical wires and control wires from the auxiliary lights and lift unit, Applicants developed an improved plug system which is disclosed in U.S. patent application Ser. No. 09/510,048, filed Feb. 22, 2000, entitled "Improved Plug System for a Snowplow," which is incorporated herein by reference. The improved plug system overcomes many of the complexities of attaching and detaching the various components of a snowplow blade unit and auxiliary lights from a vehicle, and provides for an electrical connection arrangement that can easily and conveniently connect and disconnect the auxiliary light wiring to the auxiliary lights on the outside of the vehicle and/or the wiring for the lift unit on the outside of the vehicle to enable an operator to conveniently detach and reattach the snowplow blade unit components and/or the auxiliary lights to a vehicle. Although the improved plug system resolved many of the problems associated with past wiring arrangements, the improved plug system required the operator to make electrical connections on the body of the plug at both sides of the plug. As a result, a special plug connection arrangement was needed resulting in added cost and complexity to the plug system.

SUMMARY OF THE INVENTION

The present invention is an improvement for attaching a snowplow blade unit to a vehicle which simplifies the plug system disclosed in U.S. patent application Ser. No. 09/510, 048 and enables a lift mount assembly and/or a blade mount assembly to be quickly released from the vehicle.

The snowplow blade unit includes a frame mount assembly, a lift assembly, and a blade mount assembly. The lift assembly and/or blade mount assembly are designed to be detachable and reattachable to the frame mount assembly. In one embodiment, the frame mount assembly is structurally simple and light in weight, thus facilitating the installation of the frame mount and reducing the weight imposed on the front axle of the vehicle. In another embodiment, the frame mount assembly is structurally independent of the vehicle bumper and is mountable on a vehicle without replacing the original or existing bumper. In still another embodiment, the frame mount assembly enables for quick release and removal of the lift assembly and the blade mount assembly from the frame mount assembly, thus resulting in only the frame mount assembly remaining on the vehicle. In yet another embodiment, the frame mount assembly is mounted on the vehicle to minimize both the visibility of the frame mount assembly and the projection of the parts of the frame mount assembly thereof forwardly of the vehicle. In still yet another embodiment, a support assembly is designed to be connected to the frame mount assembly. The support assembly is also designed to be connected to the lift assembly and/or the blade mount assembly. In one specific aspect of this embodiment, the support assembly and lift assembly are integrated together. In a further embodiment, the lift assembly includes a lift arm that is connected or interconnected to the blade mount assembly for lifting and lowering the blade mount assembly. The lift assembly also includes a snowplow blade lifting assembly which causes the lift arm to move up and down. As used herein, the snowplow blade lift assembly includes, but is not limited to, a power mechanism, which lifts and lowers the snowplow blade, electrical connections, and electrical wiring, and controllers associated with the power mechanism. In one specific aspect of this embodiment, the snowplow blade lift assembly includes a power mechanism to lift and lower the lift arm. In another specific aspect of this embodiment, the power mechanism includes a solenoid. In still another specific aspect of this embodiment, the solenoid is designed to directly move the lift arm and/or control an electrical or hydraulic device which in turn directly moves the lift arm. In yet another specific aspect of this embodiment, the solenoid includes a plurality of valves to control the flow of pressurized hydraulic fluid to a ram to lift the snowplow blade and/or to angle the snowplow blade. The solenoid is generally remotely controlled by an operator. In a further embodiment, the blade mount assembly includes an A-frame design to support a snowplow blade. In still a further embodiment, the blade mount includes a blade positioning assembly that positions the snowplow blade relative to the front of the vehicle. As used herein, the blade positioning assembly includes, but is not limited to, the solenoids, hydraulic assemblies and/or electrical motors that cause the snowplow to move in the left or the right direction and/or to tilt the snowplow blade, the electrical connections, electrical system, and controllers associated with the solenoids, hydraulic assemblies and/or electrical motors. In one aspect of this embodiment, the blade positioning assembly includes two pistons which move the snowplow blade from side to side. The pistons are generally electrically and/or hydraulically powered. In one specific aspect of this embodiment, the solenoids of the lift assembly directly move the pistons and/or control an electrical or hydraulic device, which in turn directly moves the pistons. In yet a further embodiment, one or more auxiliary lights are used in conjunction with the snowplow blade unit. In one specific aspect of this embodiment, one or more auxiliary lights are mounted to the snowplow blade unit. In still a further embodiment, an electrical connector is provided to electrically connect one or more components of a snowplow blade unit and/or auxiliary light system to a power source and/or controller located in the vehicle. The electrical connector is designed to simplify the electrical connections between the electrical components located on the exterior of the vehicle and the electrical connections located in the vehicle.

In accordance with still another aspect of the present invention, the frame mount assembly is designed to include a connection section that facilitates in the attachment of the support assembly and/or a structural support for one or more components of the snowplow blade unit and to help rigidity and strengthen such components. In one embodiment, the frame mount assembly includes one or more regions that at least partially assist in guiding at least a portion of the support assembly into proper orientation with the frame mount assembly so that the support assembly can be mounted to the frame mount assembly.

In accordance with another aspect of the present invention, the support assembly includes one or more connectors to enable the support assembly to be easily removed and/or attached to the frame mount assembly.

In accordance with still yet another aspect of the present invention, the lift mount assembly includes an adjustable lift arm. The height of the lift arm can be adjusted so as to accommodate a variety of different vehicles and/or increase the efficiency and operation of the lift mount assembly. In one embodiment, a plurality of connection locations are positioned on the legs of the lift mount. assembly. In still another embodiment, the lift arm is connected to enable a singular angular orientation with respect to the legs. In a further embodiment, the lift arm is connected to enable a plurality of angular orientations with respect to the legs.

In accordance with still yet another aspect of the present invention, the blade mount assembly includes a support mechanism to elevate at least a portion of the blade assembly above a ground surface when the blade mount assembly is detached from the support assembly and/or the support assembly is detached from the frame mount assembly. The support leg enables an operator to conveniently attach and/or reattach the end of the blade mount assembly to the support assembly, and/or helps prevent damage to the support assembly and/or the blade mount assembly during the connection and/or reconnection of the blade mount assembly to the support assembly.

In accordance with still yet another aspect of the present invention, there is provided a snowplow mount arrangement wherein the blade mount assembly and/or the lift mount assembly can be easily connected and/or disconnected from the vehicle. In one arrangement, the simple removal of one or two bolts or pins disengage the blade mount assembly. In another embodiment, the simple removal of a few bolts or pins results in the detachment of both the blade mount assembly and the lift mount assembly from the frame mount assembly. The components of the lift mount assembly and blade mount assembly can be oriented so that when the components are completely removed from the frame mount assembly, they can be easily stored for later reattachment and use.

In accordance with a further aspect of the present invention, the auxiliary lights are energized by an auxiliary light harness. In one embodiment, the auxiliary light harness incorporates a simple modular design that simplifies the installation of the auxiliary light harness which reduces installation errors, and improves the safety and reliability of the auxiliary multiplex light harness. In a specific aspect of this embodiment, the auxiliary light harness includes electrical connectors designed to connect to the OEM wiring of the vehicle headlights and to the OEM wiring for the power source of the vehicle headlights. The vehicle headlights include a connector which connects to the power source of a vehicle. The auxiliary light harness includes connectors whereby one of the connectors is connected to the vehicle headlight or headlight wiring and another connector is connected to the power source to which the vehicle headlight was originally attached. In another specific aspect of this embodiment, the auxiliary light harness design utilizes all of the OEM wiring of a vehicle, thus none of the OEM wiring of the vehicle is discarded or only partially utilized when the auxiliary light harness is attached to the vehicle.

In accordance with another aspect of the present invention, the auxiliary light harness is integrated with the turning signals and/or emergency lighting of the vehicle. In one embodiment, the auxiliary headlights include turn signals and/or emergency lighting and the turn signals and/or emergency lights are activated when the operator of the vehicle activates the turn signals and/or emergency lights on the vehicle.

In accordance with still another aspect of the present invention, the auxiliary light harness includes solid state circuitry which controls the activation and deactivation of the auxiliary lights, and/or the intensity of the light from the auxiliary lights. The solid state circuitry increases the reliability of the auxiliary multiplex light harness circuitry and reduces the number of wires needed to connect the auxiliary multiplex light harness to the OEM wiring of the vehicle.

In accordance with still yet another aspect of the present invention, the auxiliary light harness is designed to be a modular assembly which allows the auxiliary lights to be easily detached and removed from the vehicle without having to dismantle and remove the complete auxiliary multiplex light harness from the vehicle.

In accordance with a further aspect of the present invention, the auxiliary light harness is connected to the vehicle power source to reduce the occurrences of the auxiliary lights draining the power of the vehicle's battery. In one embodiment, the auxiliary light harness is connected to the ignition mechanism of the vehicle such that the ignition switch must be activated prior to the auxiliary lights being activated.

In accordance with still a further aspect of the present invention, the auxiliary light harness is designed to enable the vehicle's headlights or the auxiliary lights of the vehicle to be activated; or allow the auxiliary lights and the headlights of the vehicle to be activated simultaneously.

In accordance with another aspect of the present invention, the auxiliary light harness includes and/or incorporates circuitry to operate the auxiliary lights for daytime running. In one embodiment, the auxiliary light harness is integrated with the high and low beam switch for the vehicle headlights so that the same switch can be used to control the beam mode of the auxiliary lights when the auxiliary lights are activated. In one specific aspect of this embodiment, the beam mode of the auxiliary lights is automatically controlled. In another embodiment, the auxiliary light harness receives a signal from a light sensor to enable activation of the auxiliary lights during daylight hours. In still another embodiment, the auxiliary light harness circuitry alters the intensity of light produces by the auxiliary lights. In one specific aspect of this embodiment, the auxiliary light harness reduces the intensity of the auxiliary lights to produce a light intensity that is less than the light intensity at low beam mode.

In accordance with still another aspect of the present invention, the auxiliary light harness includes a processing module to control the operation of the auxiliary lights. In one embodiment, the processing module is designed to receive signals from various components on and/or in the vehicle and control the operation of the auxiliary lights based upon such received information. In one specific aspect of this embodiment, the processing module controls the operation of one or more of the auxiliary lights. In another specific aspect of this embodiment, the processing module controls the operation of one or more of the auxiliary lights and one or more of the vehicle's lights. In still another specific aspect of this embodiment, the processing module controls the operation of one or more auxiliary lights, one or more vehicle headlights, one or more vehicle turn signals, one or more vehicle parking lamps, one or more vehicle daylight running lamps, and/or vehicle emergency lights.

In accordance with still yet another aspect of the present invention, the auxiliary light harness uses and/or generates analog and/or digital signals to control one or more components on the vehicle. In one embodiment, the analog/digital signals enable the processing module to receive and/or send distinct signals that can be easily verified and/or interpreted so as to minimize errors during operation. In another embodiment, the processing module is designed to send and/or receive verification signals and/or have some other protocol to verify the signals received and/or sent, and/or to verify whether the instructions were properly received and/or sent. In still another embodiment, the auxiliary light harness incorporates a device to convert signals into a different form for transmission through the circuitry of the auxiliary multiplex light harness.

In accordance with still a further aspect of the present invention, the auxiliary light harness includes a remote switch to active and/or deactivate one or more components of the auxiliary light harness. In one embodiment, the remote switch generates a coded radio frequency, when activated by an operator, which coded frequency is received by the processing module that in turn causes the processing module to activate and/or deactivate one or more components of the auxiliary multiplex light harness and/or causes the processing module to generate and/or terminate the generation of signals. In still another embodiment, the remote switch activates one or more functions of the auxiliary multiplex light harness.

In accordance with another aspect of the present invention, the auxiliary light system include a light controller that controls the operation of the auxiliary lights. In one embodiment, the light controller is designed to control one or more modes of the auxiliary light such as, but not limited to, the low beam mode, the high beam mode, the daylight running mode, the on mode, the off mode, the turning light mode, the emergency light mode, and/or the test sequence mode. In another embodiment, the light controller is designed to receive and/or transmit analog/digital signals from and/or to the processing module. As used herein, the auxiliary light system also includes, but is not limited to, the auxiliary lights, the controllers in, and electrical connections of, the auxiliary lights, the electrical connections and electrical system for the auxiliary lights, and other controllers for the auxiliary lights.

In accordance with still another aspect of the present invention, the auxiliary light harness incorporates special connectors to ensure that the connectors will not inadvertently become disconnected during operation. In one embodiment, the connectors include a lock system such as a snap lock, which ensures that the connectors are properly secured together and to further prevent the connections from loosening or becoming disconnected during the operation of the vehicle. In another embodiment, the connectors are designed to be connected in only one manner, so as to prevent an improper connection. Specifically, the connectors are specially shaped so that the connectors can only be attached together in one manner. In still another embodiment, the connectors include a seal arrangement to prevent foreign materials from damaging and/or causing a short in the circuitry of the auxiliary light harness. In a specific aspect of this embodiment, the connectors include rubber, plastic, and/or Teflon seals to prevent foreign materials from interacting with the electrical connections of the vehicle light harness. The seals help prevent corrosion of the electrical connections, bad connections between the electrical connections, shorting of the electrical connections, and the like. In still yet another embodiment, the connectors include plugs which are utilized when the auxiliary lights are disconnected and removed from the vehicle. The connector plugs are designed to connect to the ends of these electrical connections to seal the electrical connections from the environment, thereby inhibiting and/or preventing corrosion of the electrical connections, and/or other debris from depositing on the electrical connections which may impair the operation of the auxiliary multiplex light harness when the auxiliary lights are once again attached to the harness.

In accordance with still yet another aspect of the present invention, the snowplow blade unit and/or auxiliary light system includes a simplified connector arrangement which facilitates in easily and reliably connecting and/or disconnecting one or more of the components of the snowplow blade unit and/or the auxiliary light system from the exterior of the vehicle. In one embodiment, an external electrical connector is used to provide an electrical connection to one or more components of a snowplow blade unit that are positioned externally of the vehicle. In another embodiment, an external electrical connector is used to provide an electrical connection to one or more auxiliary lights that are positioned externally of the vehicle. In still another embodiment, an external electrical connector is used to provide an electrical connection to one or more auxiliary lights and to one or more components of a snowplow blade unit that are positioned externally of the vehicle. In still yet another embodiment, the connector arrangement reduces the number of electrical connections that must be disconnected and reconnected when one or more components of a snowplow blade unit and/or the auxiliary light system are detached and reattached to the vehicle.

In accordance with a further aspect of the present invention, the connection arrangement includes an external electrical connector that has a plurality of housings. The housings are designed to be connected together to form electrical connections between the housings. In one embodiment, the external electrical connector has first and second housing components that can be secured together. Each housing component includes an interface end and a coupling end. The coupling ends of the two housing components are designed to be connected together to form an electrical connection between the two housings. The interface ends of the two housings include at least one electrical connection interface that is designed to form an electrical connection with one or more components of a snowplow blade unit and/or the auxiliary light system. In one specific aspect of this embodiment, the electrical connection interface is designed to form an electrical connection with an auxiliary light, a snowplow blade lift assembly, a snowplow blade positioning assembly, a light sensor, and combinations thereof. In another embodiment, the housings are made of a durable, corrosion resistant material to protect the internal component of the housing. In one specific aspect of this embodiment, the housings include a metal material, hard plastic material and/or rubber material. The housing material is typically selected to resist corrosion, especially when exposed to deicing materials such as, but not limited to, salt. The housing material is also typically selected to be used in cold weather. One rubber material that can be used is santoprene. In still another embodiment, one or more of the housings are insulated and/or sealed to reduce damage to the internal components in the housing, especially in harsh weather conditions.

In accordance with still a further aspect of the present invention, the external electrical connector includes housings having interface ends and coupling ends, wherein the number of electrical connection interfaces on the interface ends is different from the number of electrical connection interfaces on the coupling ends. In one embodiment, the number of electrical connection interfaces on the interface ends is greater than the number of electrical connection interfaces on the coupling ends. The reduced number of electrical connection interfaces on said coupling ends further simplifies the manner in which the housings can be connected together. Furthermore, the reduced number of electrical connection interfaces minimizes the complexity of the housings and reduces the chances of damaging the electrical connection interfaces when the housings are repeatedly connected and disconnected. In another embodiment, the number of electrical connection interfaces on the interface ends is less than or equal to the number of electrical connection interfaces on the coupling ends.

In accordance with yet a further aspect of the present invention, the electrical connection interfaces on the interface ends of the housings are designed to form an electrical connection with an electrical cable that supplies power to an auxiliary light and/or transmits information between an auxiliary light and the auxiliary light harness. In one embodiment, the cable that provides an electrical connection and/or control signals to the auxiliary light is disconnected from the auxiliary light and connected to one electrical connection interfaces on the interface end of one housing. Another cable for the auxiliary light is provided, wherein one end of the cable is connected to one electrical connection interfaces on the interface end of another housing and the other end of the cable is connected to the auxiliary light. When the coupling ends of the two housings are connected together, the electrical and/or data connection is reformed with the auxiliary light. In another embodiment, the cable that provides an electrical connection and/or control signals to the auxiliary light is disconnected from the auxiliary light and connected to a connector extending from the, interface end of one housing. The connector for the auxiliary light extends from the interface end of another housing, and the connector is connected to the auxiliary light. When the coupling ends of the two housings are connected together, the electrical and/or data connection is reformed with the auxiliary light. In one aspect of this embodiment, one or more cables extend from the interface end of each housing. In another aspect of this embodiment, one or more of the connectors extending from the interface end of one or both of the housings is molded in the housing. The molded housing forms a seal about the connectors which extend from the interface end of the housing thereby providing insulation to the internal components of the housing and/or reducing corrosion of the internal component of the housing.

In accordance with still yet a further aspect of the present invention, the electrical connection interfaces on the interface ends of the housings are designed to form a connection with an electrical cable that supplies power to a component of the snowplow blade lift assembly and/or a snowplow blade positioning assembly such as, but not limited to, a solenoid and/or transmits information between two of more components of the snowplow blade lift assembly and/or a snowplow blade positioning assembly such as, but not limited to, a solenoid and the solenoid controller. In one embodiment, one or more cables that provide an electrical connection and/or data information to a component of the snowplow blade lift assembly and/or a snowplow blade positioning assembly is disconnected from the component of the snowplow blade lift assembly and/or a snowplow blade positioning assembly and connected to one electrical connection interfaces on the interface end of one housing. Another cable or set of cables for the component of the snowplow blade lift assembly and/or a snowplow blade positioning assembly is provided, wherein one end of the one or more cables is connected to one electrical connection interfaces on the interface end of another housing, and the other end of the one or more cables is connected to the component of the snowplow blade lift assembly and/or a snowplow blade positioning assembly. When the coupling ends of the two housings are connected together, the electrical and/or data connection is reformed with the component of the snowplow blade lift assembly and/or a snowplow blade positioning assembly. In another embodiment, the cable that provides an electrical connection and/or control signals also supplies power to a component of the snowplow blade lift assembly and/or a snowplow blade positioning assembly is disconnected from the component and connected to a connector extending from the interface end of one housing. The connector for the component extends from the interface end of another housing, and the connector is connected to the component. When the coupling ends of the two housings are connected together, the electrical and/or data connection is reformed with the component of the snowplow blade lift assembly and/or a snowplow blade positioning assembly. In one aspect of this embodiment, one or more cables extend from the interface end of each housing In another aspect of this embodiment, one or more of the connectors extending from the interface end of one or both of the housings is molded in the housing. The molded housing forms a seal about the connectors which extend from the interface end of the housing thereby providing insulation to the internal components of the housing and/or reducing corrosion of the internal component of the housing.

In still another embodiment, at least a majority of the snowplow blade unit components that transmit and/or receive electrical signals, and the auxiliary light system used in conjunction with the snowplow blade unit, are connected to the housings of the external electrical connector. In one embodiment, most or all of the electrical connections of the snowplow blade unit and the auxiliary light system are routed to a single external electrical connector. As a result, the external electrical connector reduces the number of electrical connections that must be disconnected and reconnected when the auxiliary light system and components of the snowplow blade unit are disconnected and reconnected to the vehicle. The reduced number of connections simplifies and reduces the time and process required to disconnect and reconnect the auxiliary light system and components of tie snowplow blade unit to the vehicle.

In accordance with still another aspect of the present invention, at least one housing of the external electrical connector includes an attachment arrangement to secure the housing to a component of the snowplow blade unit. In one embodiment, the housing is connected to a component of the snowplow blade unit that is detachable and reattachable to the vehicle. In one specific aspect of this embodiment, the housing is connected to the lift assembly and/or the blade mount assembly. In another embodiment, the attachment arrangement on one of the housings includes a clip, slot, opening or the like. In one specific aspect of this embodiment, the housing includes at least one opening to receive a pin, bolt, screw or the like to secure the housing to the snowplow blade unit. In still another embodiment, the housing is releasably secured to the snowplow blade unit. The housing is removable for ease of repair, maintenance, replacement, or the like. In one specific aspect of this embodiment, a cotter pin arrangement, a spring clip or pin arrangement and the like are used to releasably secure the housing to the snowplow blade unit.

In accordance with yet another aspect of the present invention, at least one housing of the external electrical connector is designed to receive a protection cap that protects the electrical connection interfaces on the coupling end and/or interface ends of the housings. The protection cap is designed to inhibit or prevent dirt, moisture or the like from contacting the exposed ends of the electrical connection interfaces thereby reducing the damage to the electrical connection interfaces. The protection cap is also designed to protect the exposed ends of the electrical connection interfaces from damage resulting from contact with other objects. In one embodiment, the protection cap is connected to the coupling end of the housing when the housing is disconnected from another housing. In another embodiment, the protection cap is releasably secured to the housing so that the protection cap can be removed to allow an electrical connection interfaces to be used. In one specific aspect of this embodiment, the protection cap includes a clip, slot, groove, rib, or the like to releasably secure the protection cap to the housing. In another specific aspect of this embodiment, the housing includes a clip, slot, groove, rib, or the like to releasably secure the protection cap to the housing.

In accordance with still yet another aspect of the present invention, the coupling end and/or interface end of the housing includes a sealing arrangement to form a seal with one or more electrical connection interfaces when an electrical connection is made with the one or more electrical connection interfaces. The sealing arrangement, is designed to inhibit or prevent dirt, moisture or the like from interfering with the electrical connection that is formed with the electrical connection interfaces. In one embodiment, the sealing arrangement includes a flexible seal. In one specific aspect of this embodiment, the flexible seal at least partially surrounds an outer surface of the electrical connection interface. In another specific aspect of this embodiment, the flexible seal includes at least one corrugation. In another embodiment, the sealing arrangement includes a locking arrangement to secure an electrical connector to an electrical connection interfaces. The locking arrangement assists in ensuring that a proper electrical connection is formed with the electrical connection interfaces and/or that the electrical connection does not inadvertently disconnect. In one specific aspect of this embodiment, the locking arrangement forms a releasable connection between an electrical connector to an electrical connection interfaces. In one configuration, the locking arrangement includes a locking tab to form the releasable connection.

In accordance with a further aspect of the present invention, a housing holder is provided for one of the housings. The housing holder is designed to secure one or more of the housings of the connection arrangement to the vehicle and/or to the snowplow blade unit. The housing holder is designed to protect the electrical connection interfaces on the coupling end and/or interface end of the housing. The housing holder is also designed to inhibit or prevent dirt, moisture or the like from contacting the exposed ends of the electrical connection interfaces thereby reducing the damage to the electrical connection interfaces. The housing holder is further designed to protect the exposed ends of the electrical connection interfaces from damage resulting from contact with other objects. In one embodiment, the housing holder is secured to the grill of the vehicle. In another embodiment, the housing holder is secured to the snowplow blade unit. In still another embodiment, the housing holder includes a fastener that enables the housing holder to be releasably secured to the vehicle and/or to the snowplow blade unit. In yet another embodiment, the housing holder secures the housing in position when the housing is disconnected from another housing. In one aspect of this embodiment, one of the housings is connected to one or more electrical connectors emanating from the interior of the vehicle, such as, but not limited to, the engine compartment. When more than one electrical connection is to be connected to the housing, the plurality of electrical connections can be bundled together to facilitate in there ease of handling. When the housing, that is connected to these electrical connections, is disconnected from another housing, the housing dangles loosely in front of the vehicle. The housing holder is designed to secure this housing in position to reduce damage to the housing and/or the electrical connections. In another aspect of this embodiment, one of the housings is connected to one or more electrical connectors emanating from the snowplow blade unit. When more than one electrical connection is to be connected to the housing, the plurality of electrical connections can be bundled together to facilitate in there ease of handling. When the housing that is connected to these electrical connections is disconnected from another housing, the housing dangles loosely on the snowplow blade unit. The housing holder is designed to secure this housing in position to reduce damage to the housing and/or the electrical connections. In a further embodiment, the housing holder is releasably secured to the housing so that the housing can be removed from the holder and connected to another housing. In one aspect of this embodiment, the housing holder completely encloses the housing when the housing is inserted into the housing holder. In another aspect of this embodiment, the housing holder partially encloses the housing when the housing is inserted into the housing holder. In still another aspect of this embodiment, the housing holder includes a clip, slot, groove, rib or the like to releasably secure the housing in the housing holder. In yet another aspect of this embodiment, the housing includes a clip, slot, groove, rib or the like to releasably secure the housing in the housing holder.

In accordance with a further aspect of the present invention, the coupling ends of the housings are designed such that the housings can only be coupled together in one way. Such a housing design eliminates any problems which could occur if the housings were not properly connected together. In one embodiment, the electrical interfaces on the coupling ends of each housing are arranged in a manner such that the two housings must be oriented in a specific manner with relation to one another prior to coupling together the two housings. In another embodiment, the coupling ends of one or both housings includes a shape which requires a specific orientation of the housing with respect to one another prior to coupling together the two housings. In one aspect of this embodiment, one housing includes a cavity which telescopically receives at least a portion of the other housing. In one aspect of this embodiment, the one housing includes a coupling end having a cavity with a non-symmetrical, cross-sectional shape, and at least a portion of the coupling end of the other housing is shaped substantially similar to the cross-sectional shape of the cavity so as to fix into the cavity.

It is accordingly a primary object of the present invention to provide an improvement to the connection of a snowplow blade unit and/or auxiliary light system to a vehicle.

Another object of the present inventions is the provision of a snowplow blade unit and/or auxiliary light system which enables quick release and/or removal of the components of the snowplow blade unit and/or auxiliary light system from the vehicle.

Another object of the present invention is the provision of a snowplow blade unit and/or auxiliary light system which enables the operator to easily connect and/or disconnect various components of the snowplow blade unit and/or auxiliary light system from the vehicle.

A further object of the present invention is the provision of a snowplow blade unit which enables the attachment and/or detachment of the lift mount assembly, support assembly and/or blade mount assembly in a safe, sufficient, and/or convenient manner.

It is still yet another object of the present invention the provision of providing improvements in a snowplow blade unit mountable on a vehicle for elevating and/or lowering the snowplow blade.

Another object of the present invention is the provision of a snowplow blade unit and/or auxiliary light system which enables quick and easy detachment of the support assembly from the frame mount assembly and the auxiliary light system during periods of non-snowplow use of the vehicle.

Still yet another object of the present invention is the provision of an auxiliary light harness that can be used in conjunction with a vehicle and which is simple to install and operate.

A further object of the present invention is the provision of an auxiliary light harness which utilizes the OEM wiring of a vehicle headlight system without the need to splice the OEM wiring to the vehicle headlights.

Another object of the present invention is the provision of an auxiliary light harness which operates the auxiliary lights for daytime lighting.

Yet another object of the present invention is the provision of an auxiliary light harness which reduces the intensity of the light from the auxiliary lights during daytime running.

A further object of the present invention is the provision of an auxiliary light harness that includes a processing module to control the operation of the components of the light harness.

Still a further object of the present invention is the provision of an auxiliary light harness that incorporates a light controller in the auxiliary lights.

Yet a further object of the present invention is the provision of an auxiliary light harness which allows for one or more of the components of the harness to be easily attached and reattached to the vehicle without having to substantially remove the harness from the vehicle.

Yet another object of the present invention is the provision of an auxiliary light harness which can be easily maintained and repaired.

Another object of the present invention is the provision of an auxiliary light harness that includes a sealing arrangement to reduce degradation of the electrical circuitry and/or interface with electrical connections.

A further object of the present invention is the provision of an electrical connector that easily and conveniently connects and disconnects a plurality of different electrical connections.

Still a further object of the present invention is the provision of an electrical connector that protects the electrical connections formed with the electrical connections.

Yet a further object of the present invention is the provision of an electrical connector that has a plurality of components and one of the components is connectable to a part of a snowplow blade unit.

Another object of the present invention is the provision of an electrical connector that has two housings that can only be connected together in a single manner.

Still another object of the present invention is the provision of an electrical connector that includes molded components to seal the internal components and/or provide insulation of the internal components of the molded components.

Still another object of the present invention is the provision of a control device mounted in the cab of a vehicle for positionally controlling a snowplow blade mounted on the front end of the vehicle.

Yet another object of the present invention is the provision of a control device which optimizes a vehicle operator's convenience with respect to operating the control device to achieve blade positioning.

Still yet another object of the present invention is the provision of a control device which provides the operator selectivity with respect to positioning the control device in the cab area in a location most suitable to the operator.

A further object of the present invention is the provision of a control device having a readily separable fastener component which is mounted on the control device.

These and other objects and advantages will become apparent from the following description used to illustrate the preferred embodiment of the invention when read in conjunction with the accompanied drawings.

BRIEF DESCRIPTION OF THE DRAWINGS

The invention may take physical form in certain parts and arrangements of parts, a preferred embodiment of which will be described in detail and illustrated in the accompanied drawings which form a part hereof and wherein:

FIGS. 4–6 are the side and end views of one component of the connection arrangement;

FIGS. 7–9 are the side and end views of the other component of the connection arrangement;

DETAILED DESCRIPTION OF THE PREFERRED EMBODIMENT OF THE INVENTION

Figure 1:
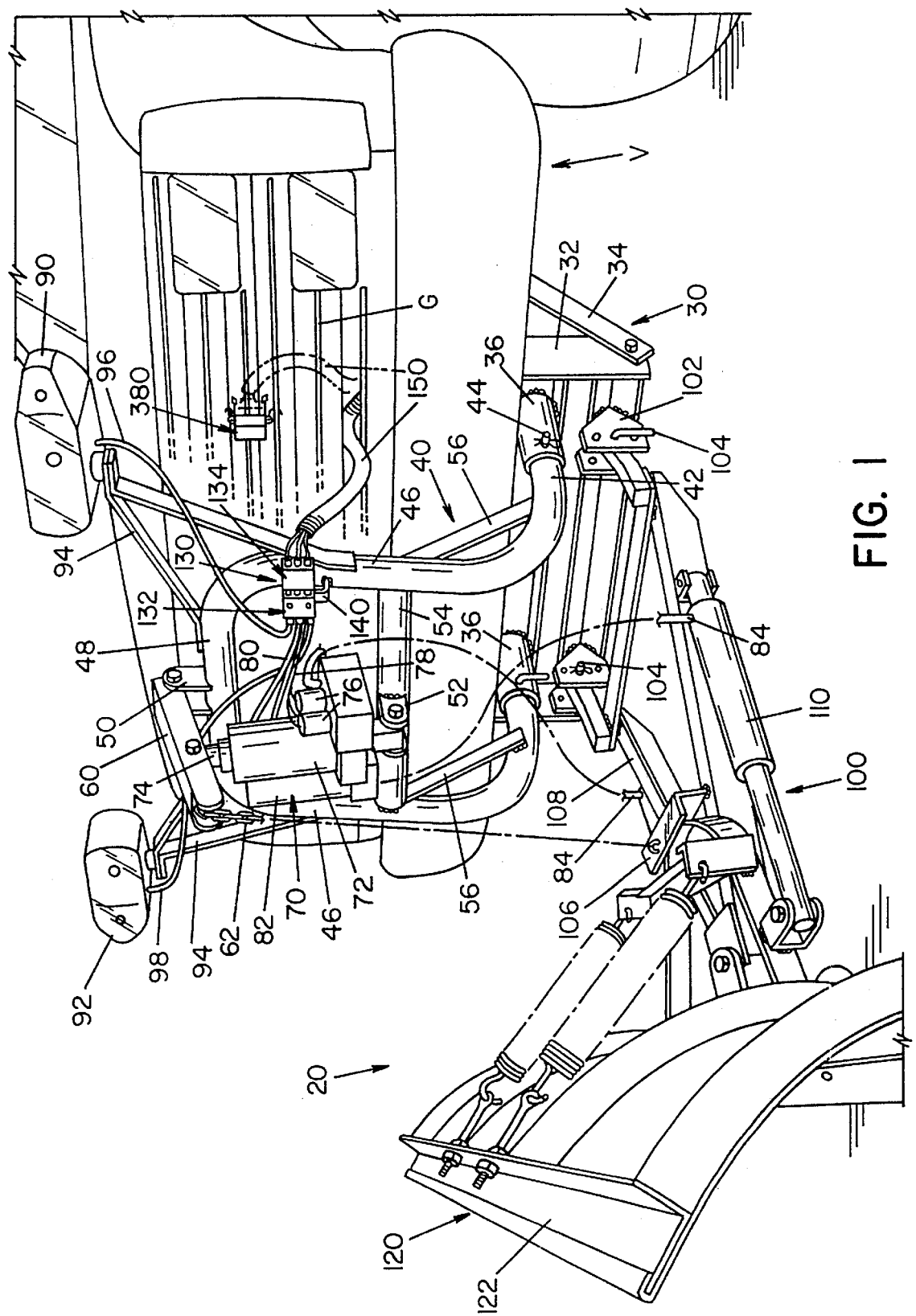
FIG. 1 is a side perspective view of a snowplow blade unit and auxiliary light system which electrical connections are connected to the connection arrangement in accordance with the present invention.

Referring now to the drawings wherein the showings are for the purpose of illustrating preferred embodiments of the invention only and not for the purpose of limiting the same, FIG. 1 discloses a snowplow quick mount lift assembly which is similar to the assembly disclosed in U.S. Pat. No. 5,036,608 which is incorporated herein by reference. As shown in FIG. 1, vehicle V includes a snowplow blade unit 20 attached to the front of the vehicle. Snowplow blade unit 20 includes a housing mount unit 30 secured to the bottom frame of vehicle V. Preferably, housing mount unit 30 is secured to the bottom of the vehicle so that none of the components extend forwardly of the bumper of the vehicle. Housing mount unit 30 includes a pair of mount plates 32 and a pair of support struts 34 connected between mount plate 32 and the vehicle frame. Two tube members 36 extend outwardly from housing mount unit 30 and are designed to receive tube ends 42 of support unit 40. Tube ends 42 are secured in tube members 36 by lock pins 44. Support unit 40 includes an upper portion 46 and a bite 48 which connect between the two upper portions 46. Support unit 40 also includes a brace member 54. Positioned on the top of bite 48 are two arm brackets 50. A lift arm 60 is pivotally connected to arm bracket 50. Brace member 54 includes lift brackets 52 which are connected to the base of lift unit 70.

Lift unit 70 is pivotally secured to lift brackets 52. Lift unit 70 includes a lift arm actuator 72 which includes a piston 74. The top of piston 74 is connected to lift arm 60 and is designed to for lifting and lowering the lift arm. Connected to the end of lift arm 60 is a chain 62 which is connected between lift arm 60 and blade mount unit 100. Lift unit 70 also includes a hydraulic cylinder 82 which directs hydraulic fluid through hydraulic lines 84 to pistons 110 on blade mount unit 100. Lift unit 70 includes several solenoids 76 which control the operation of lift arm actuator 72 and hydraulic cylinder 82. The general operation of the solenoids on lift unit 70 are well known in the art and are described in detail in U.S. Pat. Nos. 3,773,074 and 3,706,144 which are incorporated herein by reference.

Connected to upper portion 46 and bite 48 of support unit 40 are light supports 94. Light supports 94 support two auxiliary lights 90, 92 to illuminate the area in front of the vehicle. Blade mount unit 100 is connected to housing mount unit 30 by support brackets 102 and pins 104.

Blade mount unit 100 includes a chain connector 106 which receives one end of chain 62. Blade mount unit 100 includes an A-frame having two pistons 110 connected to the sides of the A-frame. Pistons 110 move plow blade unit 120 from side to side.

Plow blade unit 120 includes a standard plow blade to remove snow, ice and other debris from the ground surface. Plow blade 122 has a generally longitudinally standing structural frame, a scraper blade which is attached to the bottom of the structural frame, and an inwardly curved moldboard. A plow blade unit 120 also enables the plow blade to move forward and backwards, and one or more standard springs maintain the plow blade in an upward position. The forward and backward movement of the snowplow blade allows the blade to pass over an obstacle and move downwardly without damaging the snowplow blade. The moldboard of the snowplow blade is preferably made of ultra-high polymer or ultra-high molecular weight polyethylene plastic. However, the moldboard can be made of other materials such as, but not limited to, hardened steel. Snowplow blades which can be used in the present invention are disclosed in U.S. patent application Ser. No. 09/449,945 filed Nov. 29, 1999 and U.S. Pat. No. 4,279,084 which is incorporated herein by reference.

As shown in FIG. 1, support unit 40 can be easily and quickly removed from housing mount unit 30 by removing lock pins 44 and then removing tube ends 42 of support unit 40 from tube members 36. In addition, blade mount unit 100 can be easily removed from housing mount unit 30 by removing pins 104 thereby allowing the A-frame 108 to be released from housing mount unit 30. To reconnect support unit 40 to housing mount unit 30, tube ends 42 are reinserted into tube members 36 and lock pins 44 are inserted into their respective holes to lock tube ends 42 into place with tube members 36. Similarly, the ends of A-frame 108 of blade mount 100 are moved into support brackets 102, and pins 104 are reinserted through an opening in support bracket 102 to lock the end of the A-frame 108 to housing mount unit 30.

Figure 2:
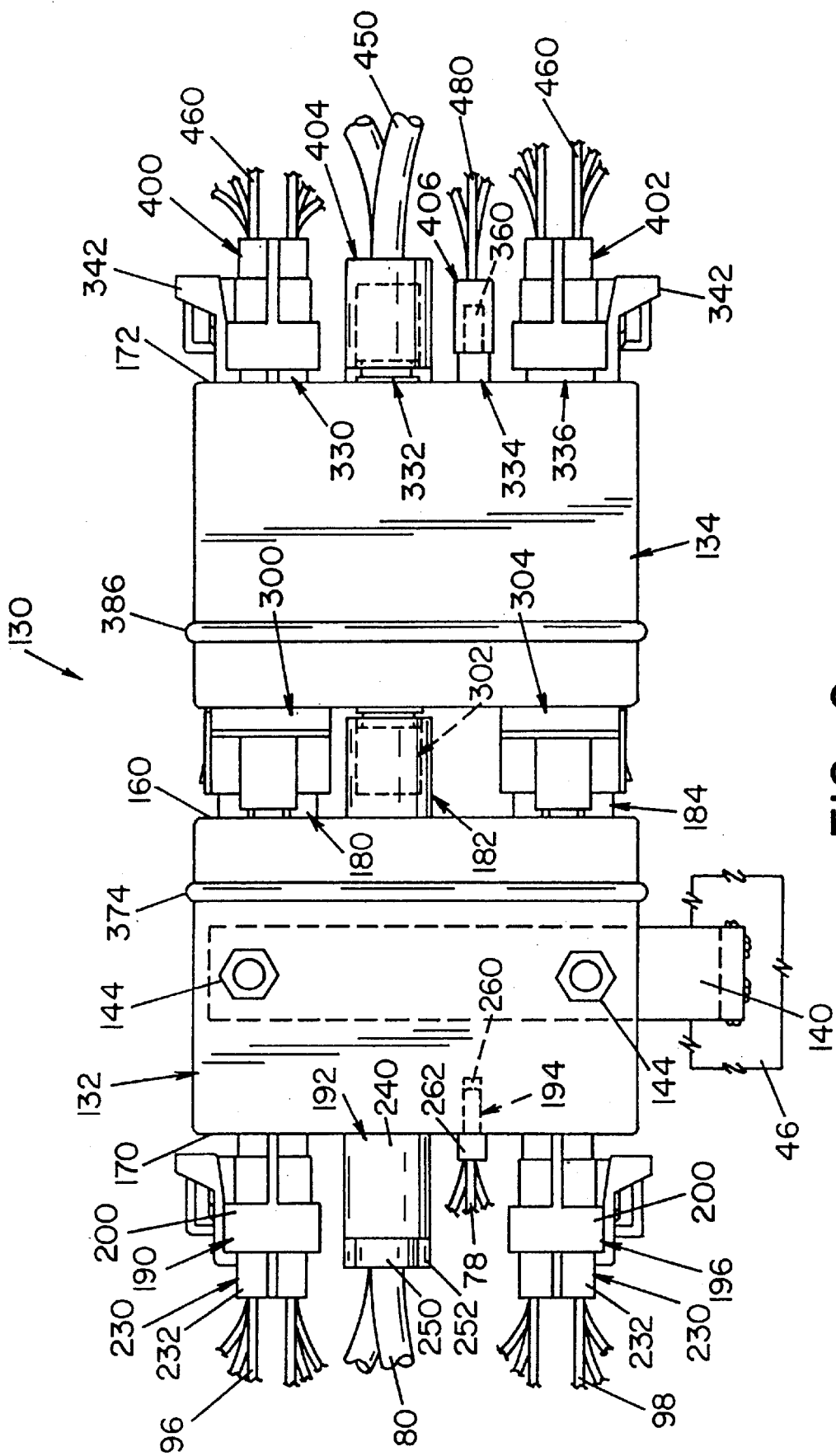
FIG. 2 is a side view of the connection arrangement wherein the two components of the connection arrangement are secured together.
Figure 10:
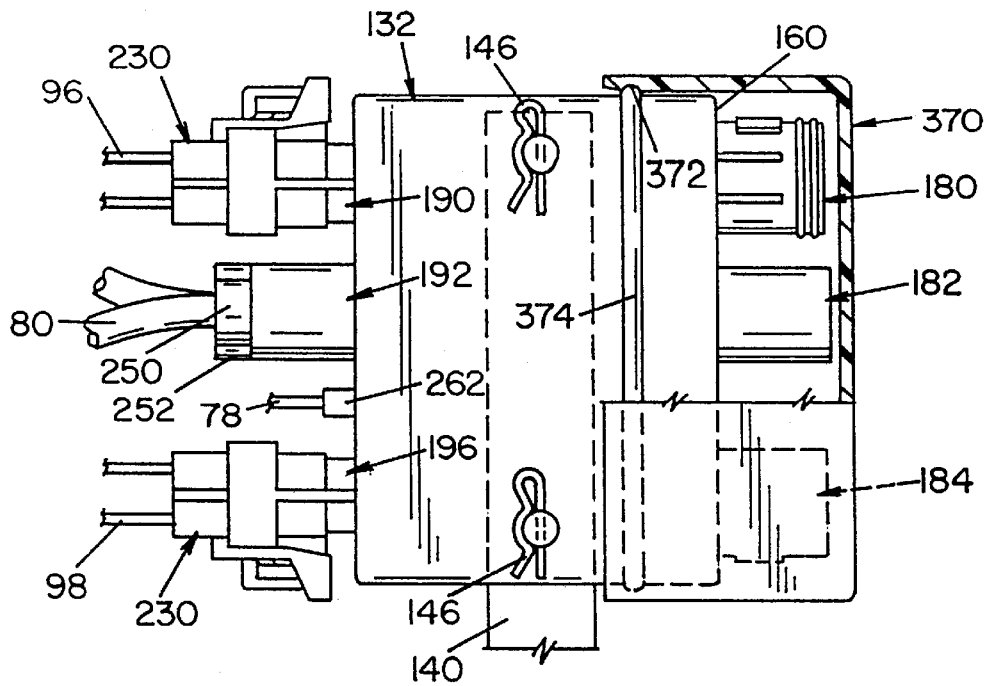
FIG. 10 is a side view of one of the components of the connection arrangement having a protective cap releasably secured to an end of the component.

Referring now to FIGS. 1–8, an electrical connector 130 is shown which provides an electrical connection to the electrical components mounted on snowplow blade unit 20. Electric connector 130 includes a frame housing 132 and a vehicle housing 134. As shown in FIGS. 1 and 7, frame housing 132 includes two openings 142 which enable frame housing 132 to be connected to housing bracket 140 which in turn is secured to upper portion 46 of support unit 40 As shown in FIG. 2, a bolt and nut combination 144 can be inserted through openings 142 to secure frame housing 132 to housing bracket 140. In an alternative arrangement as shown in FIG. 10, a cotter pin arrangement 146 can be used to releasably secure frame housing 132 to housing bracket 140.

As generally shown in FIG. 1, solenoid wires 78 and power wires 80, which control and energize lift unit 70, are connected to interface end 170 of frame housing 132. In addition, light cables 96 and 98 of auxiliary lights 90 and 92 are also connected to the interface end 170 of frame housing 132.

Figure 3:
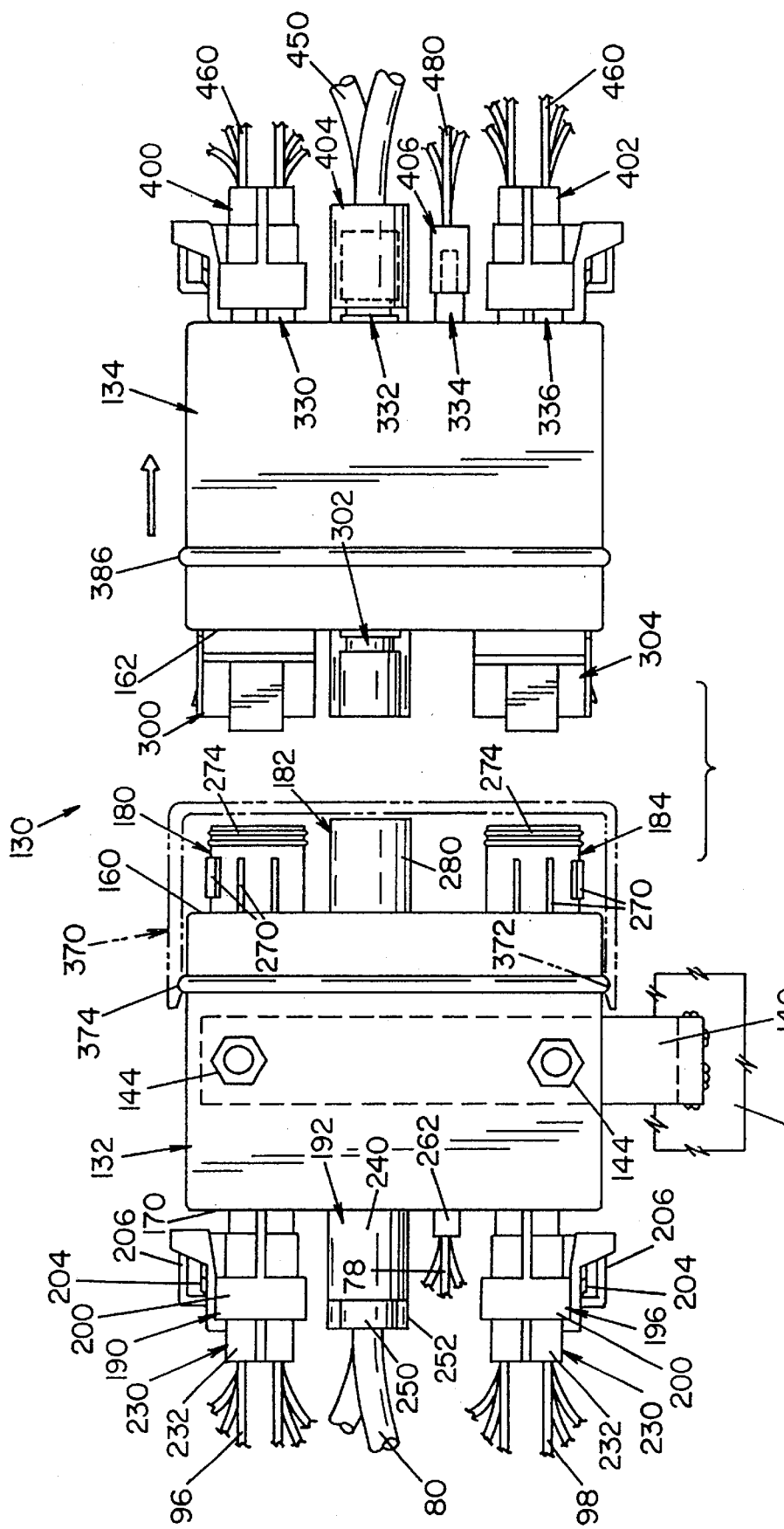
FIG. 3 is a side view of the connection arrangement wherein the two components of the, connection arrangement are disconnected from one another.

Referring now to FIGS. 2–9, there is shown a more detailed illustration of electric connector 130. FIG. 2 illustrates frame housing 132 and vehicle housing 134 connected together. FIG. 3 illustrates frame housing 132 and vehicle housing 134 being separated from one another. Referring specifically to FIGS. 2, 3 and 7–9, frame housing 132 includes a coupler end 160 and interface end 170. Coupling end 160 and interface end 170 of frame housing 132 are best illustrated in FIGS. 8 and 9 respectively. Coupler end 160 is shown to include three electrical interface connections 180, 182 and 184. Electrical interface connections 180 and 184 are both eight-way connectors. Electrical interface connection 182 is a power connector having positive and negative poles. Coupler end 160 of frame housing 132 is designed to be coupled with coupler end 162 of vehicle housing 134. Referring now to FIG. 9, coupler end 162 of frame housing 132 includes four electrical interface connections 190, 192, 194, 196. Electrical interface connections 190 and 196 are six-way connectors designed to connect with connectors at the end of light cables 96 and 98. Electrical interface connector 192 is a power connector having a positive and negative pole and is designed to connect to a connector at the end of power cables 80. Electrical interface connector 194 includes three connector openings 260 that are connected with the connectors 262 at the end of solenoid wires 78. As best shown in FIGS. 8 and 9, the number of electrical interface connections on the coupler end 162 of frame housing 132 is less than the number of electrical interface connections on interface end 170. The reduced number of connections is obtained by rewiring the solenoid connectors of electrical interface connectors 194 through the eight-way connectors of electrical interfaces 180 and 184.

Referring now to FIGS. 2 and 7–9, electrical interface connections 190, 192, 194, 196 on interface end 170 are all female connectors which are designed to receive the electrical connectors from the auxiliary lights solenoid power system and solenoid control. Electrical interface connectors 190 and 196 include a female connector housing 200. Both female connector housings include a connector cavity 202. Connector cavity 202 has a cross-sectional shape and size which is designed to receive, in a certain manner, the neck portion 232 of male connector housing 230, which male connector housing 230 is connected to the ends of light cables 96, 98. Connector cavity 202 is sized and shaped to receive neck portion 232 in a certain manner so that the electrical connection is properly made between electrical interface 190, 196 and light cables 96, 98. The top of female connector housing 200 includes a lock tab 204 which includes a tab guide 206. Tab guide 206 is designed to slide through a handle slot located on male connector housing 230 to thereby secure the male connector housing 230 in the female connector housing 200. Located within conductor cavity 202 is a positioning cavity 208 designed to allow the neck portion 232 of male connector housing 230 to be inserted in a single manner into female connector housing 200. Also positioned within conductor cavity 202 are a plurality of conducting pins 210. The conducting pins 210 are designed to be inserted into slots in the interior of male connector housing 230 to form an electrical connection between male connector housing 230 and female connector housing 200. Electrical interface 192 includes a power housing 240. Power housing 240 includes a housing cavity 242. Within the housing cavity is a connector pin 246. Positioned next to power housing 240 is an opening 248. Power housing 240 and opening 248 are designed to receive male connectors 250, 252 which are positioned on the ends of power wires 80.

As shown in FIG. 9, electrical interface connector 192 includes a pin tube 248 and a housing 244, wherein pins are inserted a pin opening 242 which is positioned adjacent to housing 244.

As shown in FIG. 7, electrical interface connections 180, 182 and 184 on coupler end 160 are all male connectors. As shown in FIG. 8, electrical interface connections 180, 184 have male ends which are essentially identical in shape and include a plurality of guide tabs 270 to ensure that the male ends of electrical interface connectors 180, 184 are properly inserted into the female ends of the electrical interface connections on coupling end 162 of vehicle housing 134. The male housings of interface connectors 180, 184 include a plurality of pin openings 272 designed to receive pins from the female end of the electrical connection interfaces on vehicle housing 134. Flexible seal 274 has a plurality of corrugated ribs. Positioned about the ends of the male connector housing 230 is a flexible seal 274 which is designed to form a seal between the male end of electrical interface connections 184 and the corresponding female housing connectors on coupling end 162 of vehicle housing 134. Electrical interface connector 182 includes a housing 280 containing a pin 282, and a pin opening 284 is positioned adjacent to the housing 280.

Referring now to FIGS. 2 and 4–6, vehicle housing 134 is shown in detail. As shown in FIG. 5, coupling end 162 of vehicle housing 134 includes three electrical interface connections 300, 302 and 304. Electrical interface connections 300 and 304 are eight-way connectors similarly designed, and each include a housing 310 which receives the male end of electrical interface connections 180, 184 of frame housing 132. The two housings 310 include positioning cavities 312 which are designed to receive the positioning ribs 270 on the male ends of electrical interface connections 180, 184 so that the male ends of the electrical interface connections are properly positioned in the two housings 310. Within housings 310 are eight pins 314 which are insertable into pin openings 272 in electrical interface connections 180, 184. Housings 310 also include a lock tab 316 which engages one of the positioning ribs 270 on the male end of electrical interface connections 180, 184 thereby releasably securing the male end of electrical interface connectors 180, 184 in housings 310 of electrical interface connections 300, 304.

Electrical interface connection 302 includes a housing 320 which includes a pin 322 positioned therein and a pin opening 324 positioned adjacent to housing 320. Pin opening 324 is designed to receive pin 282 of electrical interface connection 182. Pin 322 in housing 320 is designed to be inserted into pin opening 284 of electrical interface connection 182.

Referring now to FIG. 6, on interface end 172 of vehicle housing 134 are four electrical interface connections 330, 332, 334, and 336. Electrical interface connections 330 and 336 are similar in design and are six-way connectors. Electrical interface connections 330 and 336 are male end connectors which include six pin openings 340. Positioned on each of the housings is a latch handle 342 which is designed to secure an electrical connection from the auxiliary light harness which is bundled in vehicle cable 150 as shown in FIG. 1. The male end connectors of electrical interface connections 330 and 336 include guide ribs 344 which are used to properly position the male end of electrical interface connectors 330, 336 into the corresponding female connectors for the auxiliary light harness. FIGS. 2 and 3 illustrate connectors 400, 402 from the auxiliary light harness. Connectors 400 and 402 have a very similar design to electrical interface connectors 190, 196 on the interface end 170 of frame housing 132.

Electrical interface connection 332 includes a housing 350 which includes a pin 352 positioned in the housing 350 and a pin opening 354 positioned adjacent to the housing 350. Electrical interface connection 332 is designed to be connected to a power connector 404 which is bundled in cable 150 as shown in FIG. 1. Cable connector 404 has a similar design to electrical interface connector 192 on the interface end 170 of frame housing 132.

Electrical interface connection 334 is formed of three pins 360. The three pins 360 are designed to be connected with a solenoid control connector 406 which are bundled through cable 150 as shown in FIG. 1.

Referring now to FIG. 10, a protector cap 370 is shown to be positioned about coupler end 160 of frame housing 132. Protector cap 370 is designed to protect the electrical interface connections 180, 182, 184 from dirt, grim and other types of damage when frame housing 132 is disconnected from vehicle housing 134. Protector cap 370 includes a groove 372 which is releasably connected onto a ridge 374 on the outer perimeter of housing 132.

Figure 11:
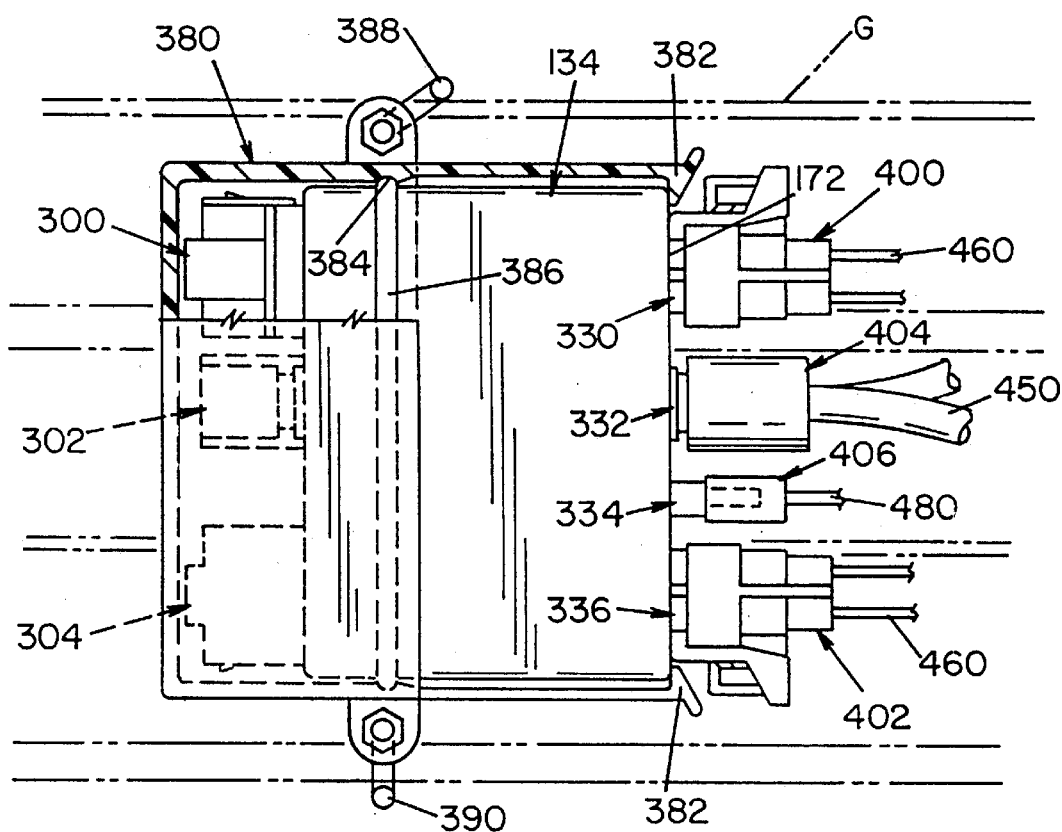
FIG. 11 is a side view of one of the components of the connection arrangement releasably secured to a housing holder that is secured to the grill of a vehicle.

Referring now to FIGS. 1 and 11, a housing holder 380 is shown to releasably secure vehicle housing 134 therein. As shown in FIG. 11, housing holder 380 includes end clips 382 which releasably engage interface end 172 of vehicle housing 134. In the interior of housing holder 380 is a groove 384 which receives a ridge 386 on the exterior surface of vehicle housing 134. The groove and ridge arrangement facilitate in maintaining vehicle housing 134 within housing holder 380. Housing holder 380 is designed to provide protection to electrical interface connections 300, 302, 304, 306 of vehicle housing 134 and to also provide general protection to the vehicle housing. Housing holder 380 includes lock tabs 388, 390 to secure housing holder 380 to the grill G of the vehicle. The lock tabs 388, 390 may permanently secure or releasably secure housing holder 380 to the grill of the vehicle.

As shown in FIG. 1, when vehicle housing 134 is disconnected from frame housing 132, vehicle housing 134 will dangle in front of the grill of vehicle V unless secured in position. The dangling of vehicle housing 134 can result in damage to the components of the vehicle housing. Housing holder 380 secures vehicle housing 134 in a secure and convenient position on the face of the grill when vehicle housing 134 is disconnected from frame housing 132. When vehicle housing 134 is to be reconnected to frame housing 132, vehicle housing 134 is removed from housing holder 380 and reconnected with frame housing 132 which is mounted onto snowplow blade unit 20.

Figure 13:
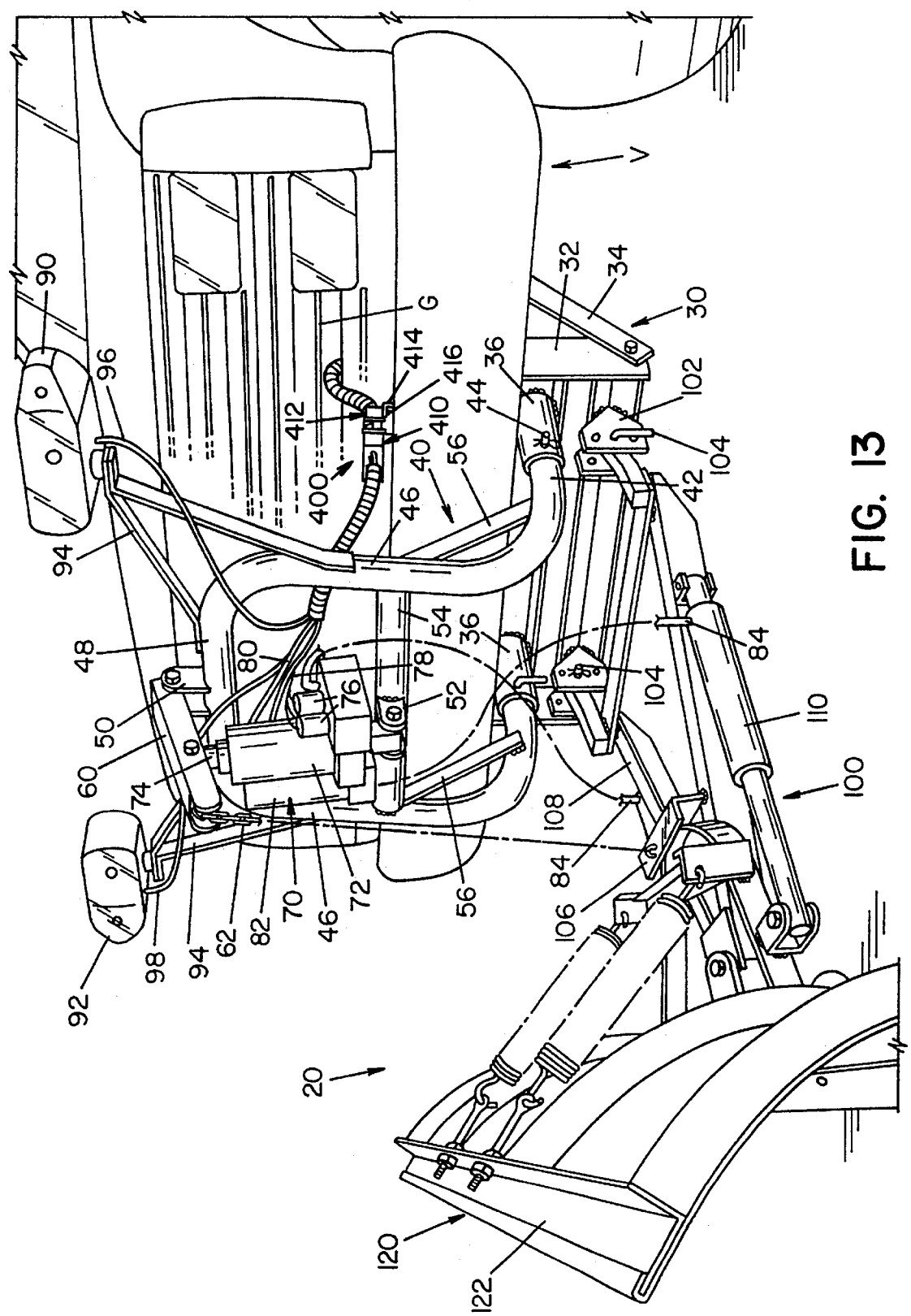
FIG. 13 is a side perspective view of a snowplow blade unit and auxiliary light system which electrical connections are connected to an alternative connection arrangement in accordance with the present invention.
Figure 14:
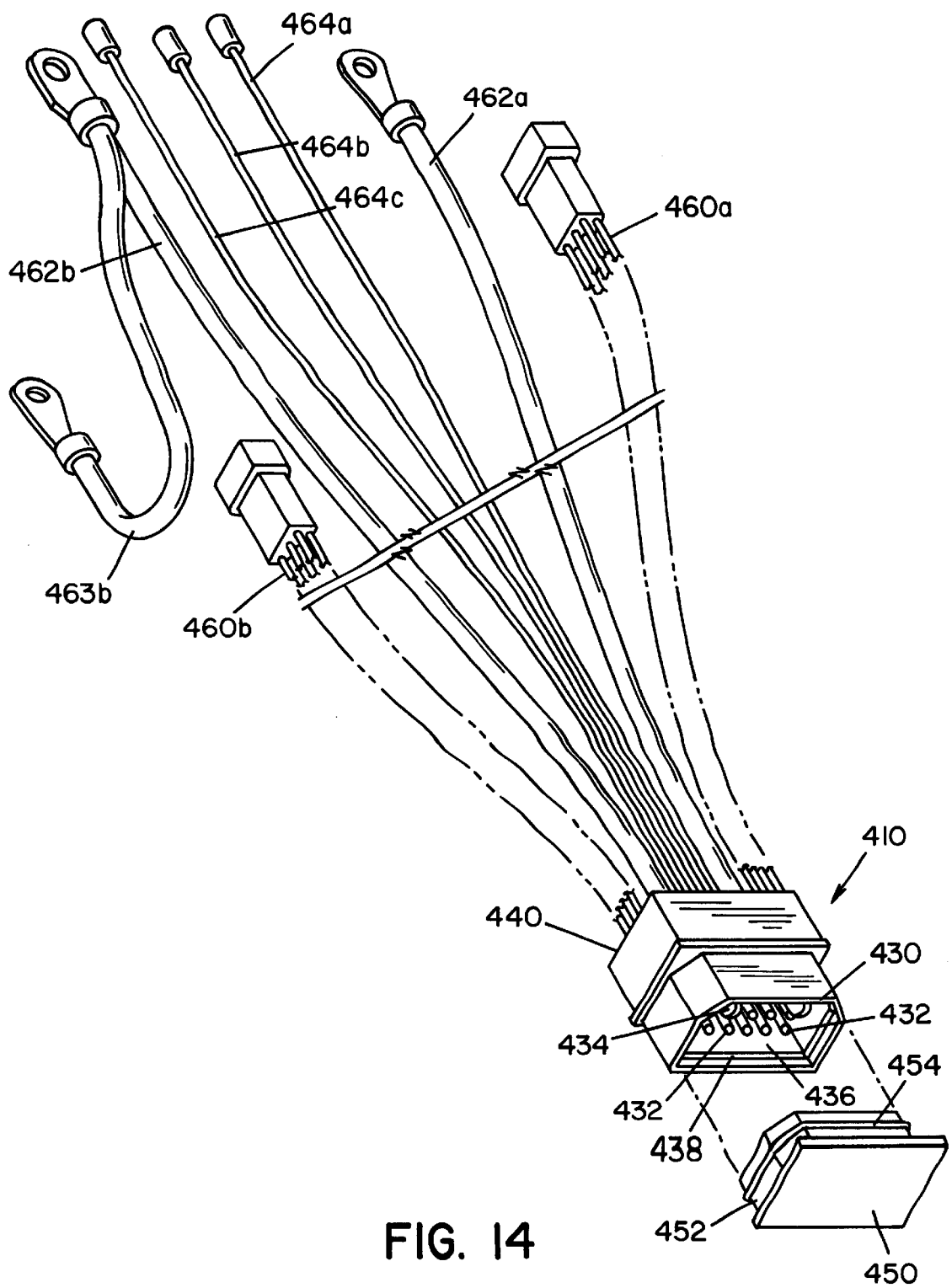
FIG. 14 is a side view of one of the components of the alternative connection arrangement and the protective cap which is releasably securable to the end of the component.
Figure 15:
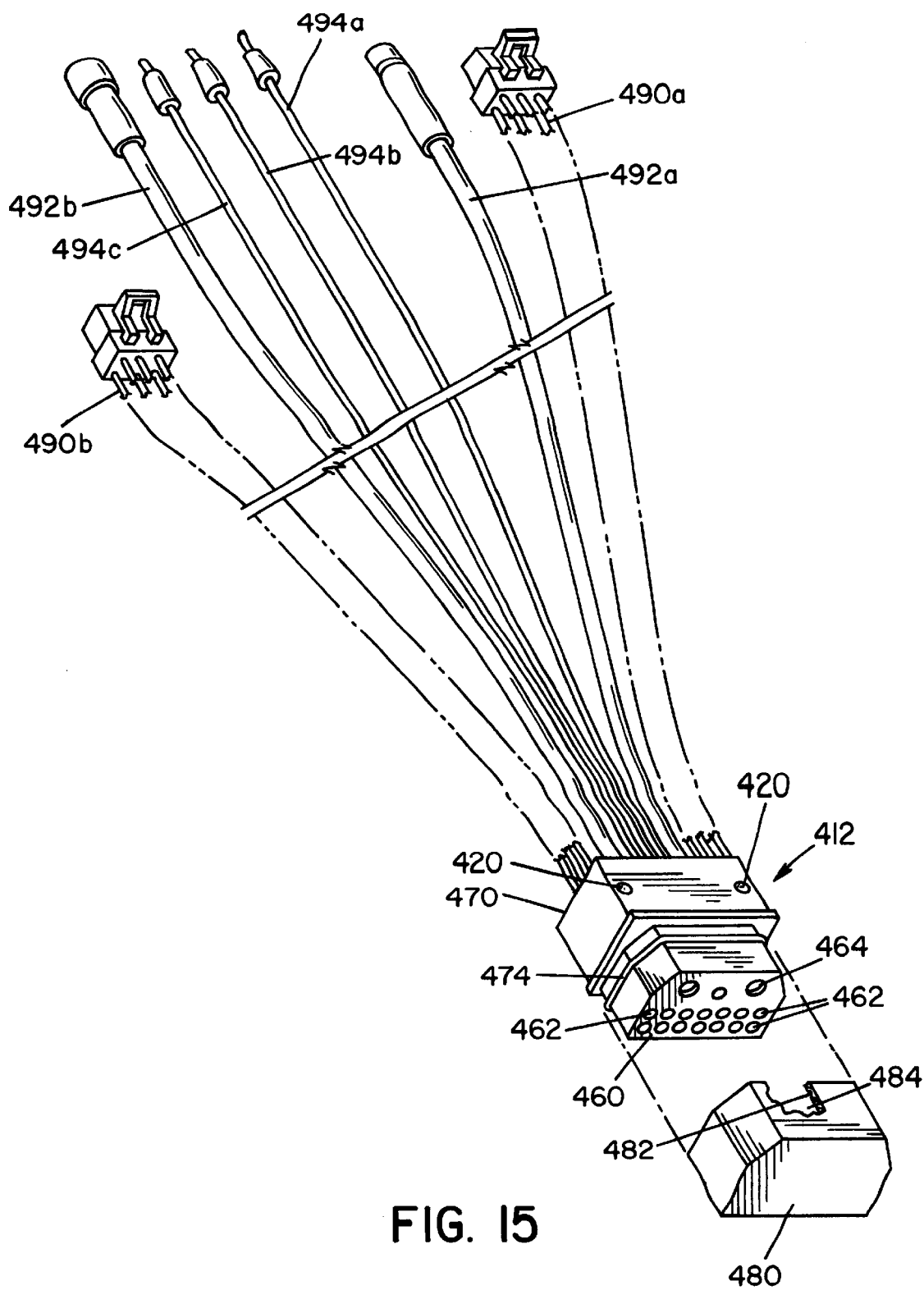
FIG. 15 is a side view of the other component of the alternative connection arrangement and the protective cap which is releasably securable to the end of the component.
Figure 16:
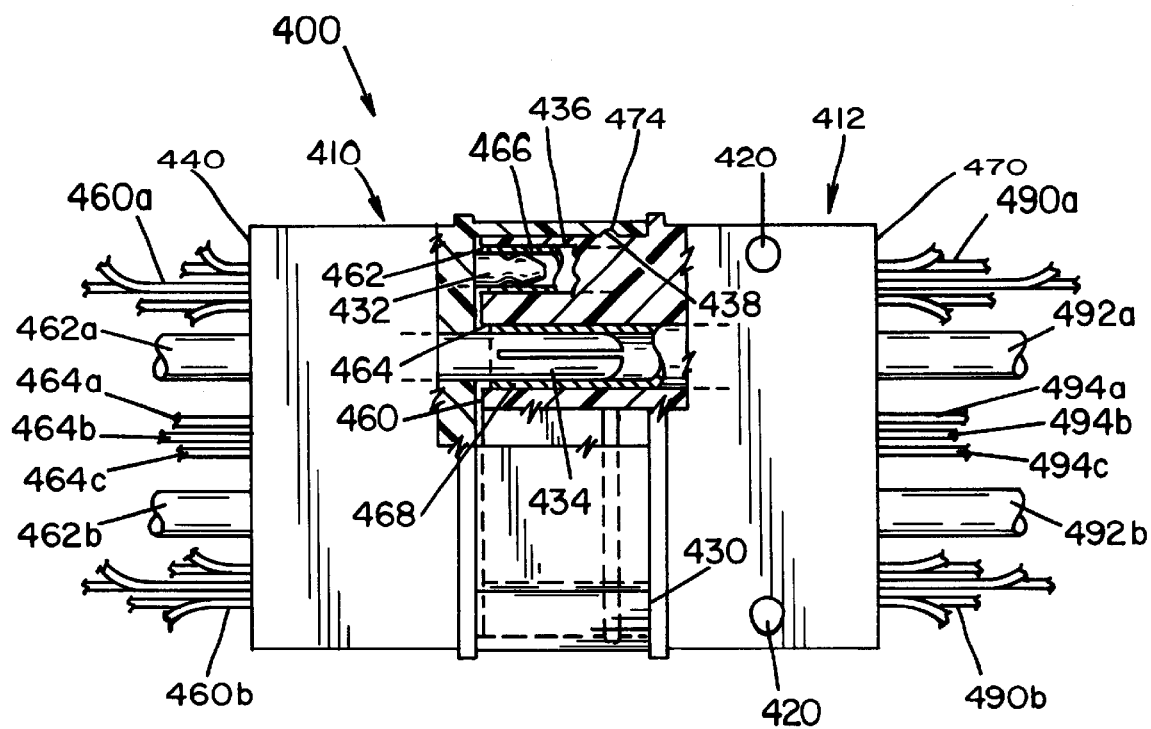
FIG. 16 is a side view of the alternative connection arrangement wherein the two components of the connection arrangement are secured together.

Referring now to FIGS. 13–16, an alternative electrical connector 400 is shown which provides an electrical connection to the electrical components mounted on snowplow blade unit 20. Electric connector 400 includes a frame housing 410 and a vehicle housing 412. FIG. 16 illustrates frame housing 410 and vehicle housing 412 connected together. FIG. 14 illustrates frame housing 410, and FIG. 15 illustrates vehicle housing 412.

Referring now to FIG. 14, shown is frame housing 410 which includes a coupler end 430 and interface end 440. Coupler end 430 includes several electrical connections 432, 434 partially enclosed in a coupling cavity 436. Coupling cavity 436 has a particular shape such that vehicle housing 410 can only be connected to the frame housing 412 in a certain and proper manner. In addition, electrical connections 432, 434 are arranged in a certain configuration in coupling cavity 436 such that vehicle housing 410 can only be connected to the frame housing 412 in a certain and proper manner. Coupling cavity 436 also includes a connection recess 438 which is designed to maintain the connection between vehicle housing 412 and frame housing 410 and/or maintain the connection between frame housing 410 and frame cap 450. Frame cap 450 is designed to protect the electrical connections 432, 434 from dirt, grim and other types of damage when frame housing 410 is disconnected from vehicle housing 412. Frame cap 450 includes a cap flange 452 which includes a cap rib 454 which releasably connects to connection rib 438 in coupling cavity 436. Cap flange 452 forms a shape that is similar to the shape of coupling cavity 436 so as to fit therein.

As shown in FIG. 14, the interface end 440 of frame housing 410 includes several electrical connections 460a, 460b, 462a, 462b, 464a, 464b, and 464c. Electrical connections 460a and 460b are designed to be connected to auxiliary lights, not shown. The ends of electrical connections 460a and 460b are designed to forms an electrical connection with the auxiliary lights to provide the auxiliary lights with power and/or data to power and/or control the operations of the auxiliary lights. Electrical connections 462a and 462b are designed to be connected to solenoids, motors and the like to provide power to such devices, not shown. Electrical connection 462b includes a secondary connection 463b which is designed to be connected to other devices and provide power thereto. Electrical connections 464a, 464b, and 464c are designed to be connected to solenoids to provide operational commands to the solenoids. All the electrical connections include one or more wires which extend from the interface end 440. The ends of the electrical wires 460a, 460b include connectors which have a certain shape and configuration so as to be inserted in a certain manner into their respective female connector of the auxiliary lights. The ends of the electrical wires 462a, 462b include connectors which have a certain shape and configuration so that such connectors can be connected to the solenoid power system. The ends of the electrical wires 464a, 464b, 464c include connectors which have a certain shape and configuration so as to be inserted in a certain manner into their respective female connectors of the solenoids. The interface end 440 is molded about the wires so as to form a seal about the wires and to hold the wires in position. The interface end 440 is molded about the wires using standard molding techniques. The wires are permanently connected to the interface end 440, thus eliminating the need to connect tie wires to the interface end. As a result, less connections are needed when using electrical connector 400, thereby simplifing its use.

Referring now to FIG. 15, vehicle housing 412 is designed to be coupled to the vehicle V. As further shown in FIG. 15, vehicle housing 412 includes two openings 420 which enable vehicle housing 412 to be connected to vehicle bracket 414 as shown in FIG. 13. As shown in FIG. 13, a bolt and nut combination 416 can be inserted through openings 420 to secure vehicle housing 412 to vehicle bracket 414. As can be appreciated, other arrangements can be used to connect vehicle housing 412 to vehicle bracket 414. As shown in FIG. 13, vehicle bracket 414 is secured to the vehicle grill G. However, vehicle bracket 414 can be secured to the vehicle at any number of convenient locations.

Referring again to FIG. 15, vehicle housing 412 includes a coupling end 460 and an interface end 470. Coupler end 460 includes several electrical openings 462, 464 which are designed to receive electrical connectors 432 and 434 of frame housing 410, thereby forming an electrical connection between the two housings. The connection of the two housings is shown in FIG. 16. As shown in FIG. 16, the interior of each electrical openings 462, 464 includes an electrical sleeve 466, 468 which is designed to form the electrical connection with electrical connectors 432, 434.

The coupler end 460 of the vehicle housing 412 has a particular shape such that vehicle housing 412 can only be connected to the frame housing 410 in a certain and proper manner. In addition, electrical openings 462, 464 are arranged in a certain configuration such that vehicle housing 412 can only be connected to the frame housing 410 in a certain and proper manner as previously discussed. Coupler end 460 also includes a connection rib 474 which is designed to maintain the connection between vehicle housing 412 and frame housing 410 and/or to maintain the connection between vehicle housing 412 and vehicle cap 480. Vehicle cap 480 is designed to protect the electrical openings 462, 464 from dirt, grim and other types of damage when vehicle housing 412 is disconnected from frame housing 410. Vehicle cap 480 includes a cap cavity 482 which includes a cap recess 484 which releasably connects to connection rib 474 on coupler end 460. Cap cavity 482 forms a shape that is similar to the shape of coupler end 460 so as to fit therein.

As shown in FIG. 15, interface end 470 includes several electrical wires 490a, 490b, 492a, 492b, 494a, 494b and 494c extending from the interface end. These electrical wires are designed to be connected to the electrical connectors for the auxiliary lights, solenoid power system and solenoid control. The ends of the electrical wires 490a, 490b include connectors which have a certain shape and configuration so as to be inserted in a certain manner into their respective female connectors of the auxiliary light cables. The ends of the electrical wires 492a, 492b include connectors which have a certain shape and configuration so as to be inserted in a certain manner into their respective female connector of the solenoid power system. The ends of the electrical wires 494a, 494b, 494c include connectors which have a certain shape and configuration so as to be inserted in a certain manner into their respective female connector of the solenoid control cables.

The interface end of the vehicle housing is molded about the wires so as to form a seal about the wires and to hold the wires in position. The interface end is molded about the wires using standard molding techniques. The wires are permanently connected to the interface end, thus eliminating the need to connect the wires to the interface end. As a result, less connections are needed when using electrical connector 400, thereby simplifying its use.

Figure 12:
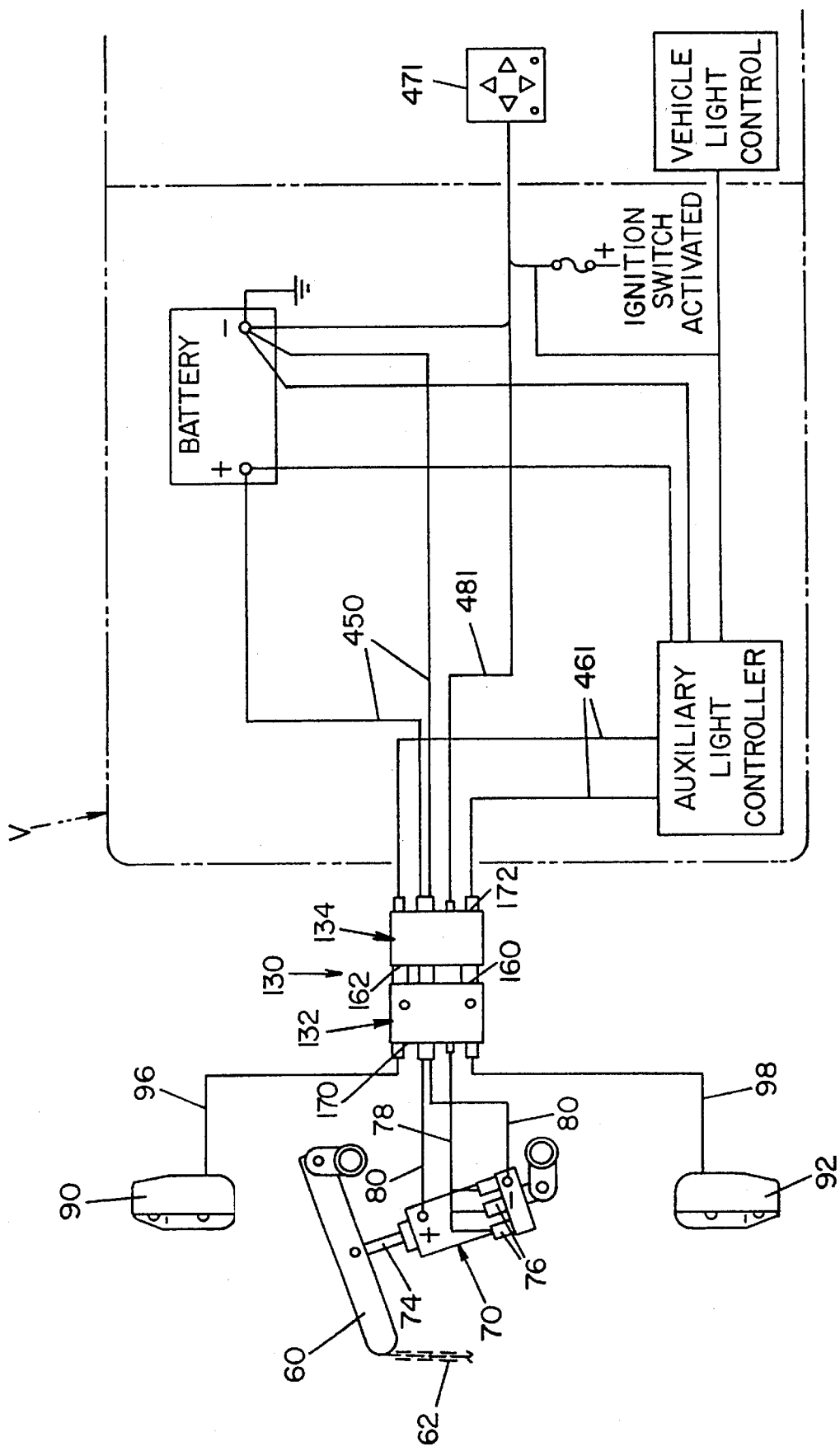
FIG. 12 is a schematic illustration of the connection of the hydraulic and electrical system for controlling the position of the snowplow blade through a control device and the connection of the electrical system for the auxiliary lights according to the present invention.

Referring now to FIG. 12, a general schematic of the snowplow blade lift mechanism and the auxiliary light system of the vehicle is illustrated. Connected to the front of the vehicle are auxiliary lights 90 and 92. Auxiliary light 90 is connected by light cable 96 to interface end of the electric connector. Similarly, auxiliary light 92 is electrically connected to the interface end by light cable 98. A lift unit 70 is also shown to be connected at the front of the vehicle. Lift unit 70 is designed to move lift arm 60, which in turn moves chain 62 to raise and lower the snowplow. Power is supplied to lift unit 70 by power wires 80 which are connected to the interface end of the frame housing. The solenoids 76 on lift unit 70 are electrically connected to the interface end by solenoid wires 78. Connected to the interface end of the vehicle housing are the power wires 450 from the vehicle battery. In addition, wires 461 from the auxiliary light controller are also connected to the interface end of the vehicle housing. A lift controller 471 provides signals to the solenoids and is also shown to be connected by wires 481 to the interface end of the vehicle housing. FIG. 12 also illustrates that the control pad and auxiliary light controller are activated after the ignition switch is activated to reduce the possibility of drain on the battery. In addition, the auxiliary light receives one or more electrical signals from the vehicle light control so as to properly adjust the intensity of the auxiliary lights. A more detailed description of the operation of the light harness is set forth in U.S. patent application Ser. Nos. 09/294,905, filed Apr. 21, 1999 and 09/159,035, filed Sep. 23, 1998 which are incorporated herein by reference. In addition, a more detailed description of the operation of the control unit for the lift unit is set forth in U.S. Pat. Nos. 5,361,519 and 3,706,144 which are both incorporated herein by reference.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus described the invention it is claimed:

1. An external electrical connector for connecting a plurality of snowplow blade unit components that are positioned externally to a motor vehicle, said electrical connector comprising first and second housing components that can be secured together, each housing component having an interface end and a coupling end, each of said coupling ends of said two housing components having at least one electrical connection interface that are connectable together to form an electrical connection between said housing components, at least one of said interface ends having a plurality of electrical connection interfaces to form an electrical connection with a plurality of snowplow blade unit components, at least two of said snowplow blade components having a connector, one of said connectors forming one of said electrical connections with one of said electrical interfaces and another of said connectors forming another of said electrical connections with another of said electrical interfaces, said plurality of snowplow blade unit components having at least one auxiliary light and at least one component selected from the group consisting of a snowplow blade lift assembly, a snowplow blade positioning assembly, a light sensor, and combinations thereof.

2. The external connector as defined in claim 1, wherein at least one of said two housing components has a greater number of electrical connection interfaces on said interface end than a number of electrical connection interfaces on said coupling end.

3. The external connector as defined in claim 2, wherein at least one electrical connection interface on said interface end connectable to an electrical connector of a first auxiliary light and at least another one electrical connection interface on said interface end connectable to an electrical connector of a second auxiliary light.

4. The external connector as defined in claim 3, wherein at least one electrical connection interface on said interface end connectable to an electrical connector of a first auxiliary light and at least another one electrical connection interface on said interface end connectable to an electrical connector of a second auxiliary light.

5. The external connector as defined in claim 4, wherein at least one electrical connection interface on said interface end connectable to an electrical connector of a snowplow blade unit component selected from the group consisting of said snowplow blade lift assembly, said snowplow blade positioning assembly, and combinations thereof.

6. The external connector as defined in claim 5, wherein said second housing component having at least one connector to connect said second housing component to at least one component of said snowplow blade unit.

7. The external connector as defined in claim 6, wherein said at least one connector at least partially forms a releasable connection.

8. The external connector as defined in claim 6, wherein said coupling end of said second housing component having at least one coupling section to receive a protection cap, said protection cap at least partially covering at least one of said electrical connection interfaces on said coupling end.

9. The external connector as defined in claim 8, wherein at least one electrical connection interface on said interface end of at least one housing component having an interface sealing arrangement positioned about at least one of said electrical connections formed with said electrical connection interface.

10. The external connector as defined in claim 9, wherein said coupling end of one of said housing components having a coupling end connector, said coupling end connector adapted to at least partially releasably lock together the two coupling ends of said first and second housing components.

11. The external connector as defined in claim 10, comprising a coupling sealing arrangement positioned about said electrical connection formed between said two housing components.

12. The external connector as defined in claim 11, comprising a housing holder adapted to be releasably secured to said first housing component, said housing holder having a connector adapted to be secured to said vehicle, said housing hold at least partially covering said coupling end of said first housing component when said first housing component is secured to said housing holder.

13. The external connector as defined in claim 12, wherein said housing holder having a fastener to at least partially releasably engage said coupling end of said first housing component.

14. The external connector as defined in claim 1, wherein said second housing component having at least one connector to connect said second housing component to at least one component of said snowplow blade unit.

15. The external connector as defined in claim 1, wherein said coupling end of said second housing component having at least one coupling section to receive a protection cap, said protection cap at least partially covering at least one of said electrical connection interfaces on said coupling end.

16. The external connector as defined in claim 1, wherein said coupling end of one of said housing components having a coupling end connector, said coupling end connector adapted to at least partially releasably lock together the two coupling ends of said fist and second housing components.

17. The external connector as defined in claim 1, comprising a coupling sealing arrangement positioned about said electrical connection formed between said two housing components.

18. The external connector as defined in claim 1, comprising a housing holder adapted to be releasably secured to said first housing component, said housing holder having a connector adapted to be secured to said vehicle, said housing hold at least partially covering said coupling end of said first housing component when said first housing component is secured to said housing holder.

19. An external electrical connector for electrically connecting a plurality of snowplow blade unit components that are positioned externally to a motor vehicle, said electrical connector comprising first and second housing components that can be secured together, each housing component having an interface end and a coupling end, each of said coupling ends of said two housing components having a plurality of electrical connection interfaces that are connectable together to form an electrical connection between said housing components, at least one of said interface ends having a plurality of electrical connection interfaces to form an electrical connection with a plurality of snowplow blade unit components, at least two of said snowplow blade components having a connector, one of said connectors forming one of said electrical connections with one of said electrical interfaces and another of said connectors forming another of said electrical connections with another of said electrical interfaces, said plurality of snowplow blade unit components having at least one auxiliary light and at least one component selected from the group consisting of a snowplow blade lift assembly, a snowplow blade positioning assembly, a light sensor, and combinations thereof.

20. The external connector as defined in claim 19, wherein said plurality of electrical connections on said at least one of said interface ends having a plurality of electrical cables extending from said at least one of said interface ends.

21. The external connector as defined in claim 20, wherein said plurality of electrical connections on said interface ends having a plurality of electrical cables extending from said at least one of said interface ends.

22. The external connector as defined in claim 21, wherein a plurality of electrical cables being at least partially molded in said interface ends.

23. The external connector as defined in claim 20, wherein said at one of said plurality of electrical cables being at least partially molded in said at least one of said interface ends.

24. The external connector as defined in claim 23, wherein said plurality of electrical cables being at least partially molded in said at least one of said interface ends.

25. The external connector as defined in claim 19, wherein at least one electrical connection interface on said interface end connectable to an electrical connector of a first auxiliary light and at least another one electrical connection interface on said interface end connectable to an electrical connector of a second auxiliary light.

26. The external connector as defined in claim 25, wherein at least one electrical connection interface on said interface end connectable to an electrical connector of a snowplow blade unit component selected from the group consisting of said snowplow blade lift assembly, said snowplow blade positioning assembly, and combinations thereof.

27. The external connector as defined in claim 19, wherein said second housing component having at least one connector to connect said second housing component to at least one component of said snowplow blade unit.

28. The external connector as defined in claim 27, wherein said at least one connector at least partially forms a releasable connection.

29. The external connector as defined in claim 19, wherein said coupling end of said second housing component having at least one coupling section to receive a protection cap, said protection cap at least partially covering at least one of said electrical connection interfaces on said coupling end.

30. The external connector as defined in claim 19, wherein said first housing having a connection cavity to telescopically receive at least a portion of said second housing when said first and second housing are connected together.

31. The external connector as defined in claim 30, wherein connection cavity having a cross-sectional shape and at least a portion of said second cavity having a cross sectional shape substantially similar to said cavity cross section shape such that said portion of said second cavity is insertable into said connection cavity.

32. The external connector as defined in claim 30, wherein connection cavity having a cross-sectional shape that allows one orientation of said portion of said second housing to be inserted into said connection cavity to form an electrical connection between said two housings.

33. The external connector as defined in claim 30, wherein said coupling end of one of said housing components having a coupling end connector, said coupling end connector adapted to at least partially releasably secure together the two coupling ends of said first and second housing components.

34. The external connector as defined in claim 19, comprising a housing holder adapted to be at least partially releasably secured to said first housing component, said housing holder having a connector adapted to be secured to said vehicle, said housing holder at least partially covering said coupling end of said first housing component when said first housing component is secured to said housing holder.

35. The external connector as defined in claim 34, wherein said housing holder having a fastener to releasably engage said coupling end of said first housing component.

* * * * *